United States Patent
Li et al.

(10) Patent No.: US 12,375,571 B2
(45) Date of Patent: Jul. 29, 2025

(54) METHOD AND DEVICE FOR INFORMATION TRANSMISSION

(71) Applicant: Samsung Electronics Co., Ltd., Suwon-si (KR)

(72) Inventors: Lisi Li, Beijing (CN); Weiwei Wang, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/288,523

(22) PCT Filed: May 2, 2022

(86) PCT No.: PCT/KR2022/006229
§ 371 (c)(1),
(2) Date: Oct. 26, 2023

(87) PCT Pub. No.: WO2022/231397
PCT Pub. Date: Nov. 3, 2022

(65) Prior Publication Data
US 2024/0214457 A1    Jun. 27, 2024

(30) Foreign Application Priority Data

Apr. 30, 2021  (CN) .......................... 202110485608.8
Aug. 3, 2021  (CN) .......................... 202110885896.6

(Continued)

(51) Int. Cl.
*H04L 67/145*  (2022.01)
*H04W 74/0833*  (2024.01)
*H04W 76/10*  (2018.01)

(52) U.S. Cl.
CPC ....... *H04L 67/145* (2013.01); *H04W 74/0833* (2013.01); *H04W 76/10* (2018.02)

(58) Field of Classification Search
CPC . H04L 67/145; H04L 5/0053; H04L 41/0895; H04L 41/0806; H04L 41/16;
(Continued)

(56) References Cited

U.S. PATENT DOCUMENTS 11,134,361 B2    9/2021  Fischer et al.
2019/0141769 A1*  5/2019  Jin .......................... H04L 43/10
(Continued)

FOREIGN PATENT DOCUMENTS

KR   10-2021-0039445 A   4/2021
WO      2020/146739 A1   7/2020
(Continued)

OTHER PUBLICATIONS

RAN3; RAN3 CRs for NR small data transmissions in Inactive state; 3GPP TSG-RAN Meeting #95; RP-220233; Online; Mar. 17-23, 2022; Mar. 14, 2022.
(Continued)

*Primary Examiner* — Benjamin M Thieu
(74) *Attorney, Agent, or Firm* — Jefferson IP Law, LLP

(57) ABSTRACT

The disclosure relates to a 5G or 6G communication system for supporting a higher data transmission rate. A method executed by a first node in a wireless communication system is provided. The method may include: establishing a bearer for transmitting a first message; and receiving, from a second node, related information about transmission of the first message. The first message is sent by a user equipment (UE) in an idle mode or an inactive state to the second node via the bearer.

18 Claims, 20 Drawing Sheets

(30) Foreign Application Priority Data

Dec. 23, 2021 (CN) .......................... 202111588317.8
Mar. 31, 2022 (CN) .......................... 202210346525.5

(58) Field of Classification Search
CPC ....... H04L 67/52; H04L 69/324; H04L 69/24; H04W 74/0833; H04W 76/10; H04W 12/033; H04W 76/12; H04W 12/037; H04W 64/00; H04W 80/02; H04W 76/27; H04W 8/24
See application file for complete search history.

(56) References Cited

U.S. PATENT DOCUMENTS

| | | | |
|---|---|---|---|
| 2019/0281651 A1* | 9/2019 | Lee ........................ | H04W 76/25 |
| 2021/0153037 A1 | 5/2021 | Ke et al. | |
| 2022/0312540 A1* | 9/2022 | da Silva ................ | H04W 76/30 |
| 2023/0038013 A1* | 2/2023 | Shi ........................ | H04W 76/27 |
| 2024/0098843 A1* | 3/2024 | Kadiri ................... | H04W 76/15 |
| 2024/0107335 A1* | 3/2024 | Shrestha ............... | H04W 24/10 |

FOREIGN PATENT DOCUMENTS

| | | |
|---|---|---|
| WO | 2021/030715 A1 | 2/2021 |
| WO | 2021/032907 A1 | 2/2021 |
| WO | 2021/076027 A1 | 4/2021 |

OTHER PUBLICATIONS

RAN2; RAN2 CRs to NR small data transmissions in Inactive state; 3GPP TSG-RAN Meeting #95; RP-220487; Online; Mar. 17-23, 2022; Mar. 15, 2022.

RAN2; RAN2 CRs to NR positioning enhancements; 3GPP TSG-RAN Meeting #95; RP-220479; Online; Mar. 17-23, 2022; Mar. 15, 2022.

3GPP; 3rd Generation Partnership Project; Technical Specification Group Radio Access Network; NR; NR and NG-RAN Overall Description; Stage 2 (Release 17); 3GPP TS 38.300; V17.0.0; (Mar. 2022); Apr. 13, 2022; Valbonne, France.

3GPP; 3rd Generation Partnership Project; Technical Specification Group Radio Access Network; NG-RAN; Xn application protocol (XnAP) (Release 17); 3GPP TS 38.423; V17.0.0; (Apr. 2022); Apr. 6, 2022; Valbonne, France.

3GPP; 3rd Generation Partnership Project; Technical Specification Group Radio Access Network; NG-RAN; F1 application protocol (F1AP) (Release 17); 3GPP TS 38.473; V17.0.0; (Apr. 2022); Apr. 6, 2022; Valbonne, France.

3GPP; 3rd Generation Partnership Project; Technical Specification Group Radio Access Network; NG Radio Access Network (NG-RAN); Stage 2 functional specification of User Equipment (UE) positioning in NG-RAN (Release 17); 3GPP TS 38.305; V17.0.0; (Mar. 2022); Apr. 14, 2022; Valbonne, France.

3GPP; 3rd Generation Partnership Project; Technical Specification Group Radio Access Network; NR; Radio Resource Control (RRC) protocol specification (Release 17); 3GPP TS 38.331; V17.0.0; (Mar. 2022); Apr. 19, 2022; Valbonne, France.

3GPP; 3rd Generation Partnership Project; Technical Specification Group Radio Access Network; NG-RAN; NG Application Protocol (NGAP) (Release 16); 3GPP TS 38.413; V16.5.0; (Apr. 2021); Apr. 9, 2022; Valbonne, France.

3GPP; 3rd Generation Partnership Project; Technical Specification Group Radio Access Network; NG-RAN; E1 Application Protocol (E1AP) (Release 16); 3GPP TS 38.463 V16.5.0 (Apr. 2021); Apr. 9, 2022; Valbonne, France.

International Search Report with Written Opinion dated Aug. 10, 2022; International Appln. No. PCT/KR2022/006229.

* cited by examiner

METHOD AND DEVICE FOR INFORMATION TRANSMISSION

TECHNICAL FIELD

The present disclosure relates to a wireless communication system, and more particularly, to methods and devices for information transmission.

BACKGROUND ART

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (cMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is un-available, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

With the development of mobile communications and the diversification of services, user equipment positioning has gradually become one of the most important applications in communication networks, the requirements for positioning delay and accuracy are getting higher and higher, especially for IIOT (Industrial Internet of Things) application scenarios, and the demand for positioning of a user equipment in an inactive state or an idle mode is also increasing.

The objectives of the embodiments are to reduce power consumption of the UE, to prolong battery life of the UE, and to reduce delay and signaling overhead of message transmission, to improve security and reliability of information.

Solution to Problem

According to an aspect of the present disclosure, there is provided a method executed by a first node in a wireless communication system, and the method may include: establishing a bearer for transmitting a first message; and receiving, from a second node, related information about transmission of the first message, the first message being sent by user equipment (UE) in an idle mode or inactive state to the second node via the bearer.

In an embodiment, the first message may be a security-protected first message, and being security-protected refers to that the first message is security protected on a non-access stratum (NAS) and/or an access stratum (AS), for example, operations such as encryption/decryption, integrity protection/integrity verification and so on are performed on the first message on a NAS and/or AS protocol. It should be understood that, the above-described security protection-related operations are only examples, and other security protection-related operations may also be performed on the first message without departing from the scope of the present disclosure. The first message may include at least one of an access stratum (AS) message, a non-access stratum (NAS) message, and a message on a user plane. The first message may include at least one of: related information for indicating a cause for sending the first message; related information for indicating a core network node where the UE is located; and related information for indicating a node serving the UE and used for location management.

In an embodiment, the receiving, from the second node, related information about transmission of the first message may include at least one of: receiving, from the second node, the first message; receiving, from the second node, a fourth message for requesting UE context, the UE context including related information for requesting transmission of the first message, the UE being a UE in an idle mode or inactive state; and sending, to the second node, a fifth message including configuration of a bearer transmitting the first message; and receiving, from the second node, a sixth message, the sixth message including a data unit after the receive operation of the first message through part of the protocol layers.

In an embodiment, the receiving, from the second node, the data unit after the receive operation of the first message through part of the protocol layers may include: receiving, from the second node, the data unit after the receive operation of the first message through common configuration of a protocol of the bearer.

In an embodiment, the sixth message may further include at least one of: related information for indicating whether the sixth message includes the first message, and related information for indicating a cause for sending the sixth message.

In an embodiment, the fifth message may include at least one of: related information of transmission configuration of an access stratum AS security mode required for receiving the first message; related information of transmission configuration of a radio link control (RLC) layer; and related information for indicating the core network node.

In an embodiment, the method executed by the first node may further include at least one of: receiving, from the UE, first capability information, the first capability information indicating a capability of whether the UE supports transmission of the first message in an idle mode or inactive state; establishing, in response to a request from the core network node, a bearer for the UE to transmit the first message in the idle mode or inactive state; and sending, to the UE, configuration of the bearer for the UE to transmit the first message in the idle mode or inactive state and/or system information, the system information including related information for indicating whether the first node supports transmission of the first message.

In an embodiment, the bearer includes a signaling radio bearer (SRB) and/or a data radio bearer (DRB) transmitted through a common channel; and the bearer supports the access stratum (AS) security mode and a radio link control (RLC) acknowledged mode (AM) and/or an RLC unacknowledged mode (UM) and/or an RLC transparent mode (TM).

In an embodiment, the SRB may have characteristics below: it has a packet data convergence protocol PDCP entity; it has an RLC entity; and it is transmitted using a common control channel (CCCH) or a dedicated control channel (DCCH) multiplexed on the CCCH; and the SRB may use the RLC TM or a common RLC AM or a common RLC UM; and wherein the DRB may be transmitted by the common control channel (CCCH) or the dedicated traffic channel (DTCH) multiplexed on the CCCH; and the DRB may use the RLC TM or the common RLC AM or the common RLC UM.

In an embodiment, the first node includes a first sub-node, a second sub-node, and a third sub-node; and the method may further include: sending, by the first sub-node to the second sub-node and/or the third sub-node, at least one of: related information for indicating an unreleased bearer; and related information for indicating not to release a bearer.

According to another aspect of the present disclosure, there is provided a method executed by a second node in a wireless communication system, the method may include: receiving, from a user equipment (UE) in an idle mode or inactive state, a first message, the first message being sent by the UE through a bearer established by a first node and used for transmitting the first message; and sending, to the first node, related information about transmission of the first message.

In an embodiment, the first message may be a security-protected first message, wherein the first message may include at least one of an access stratum (AS) message, a non-access stratum (NAS) message, and a message on a user plane, and wherein the first message may include at least one of: related information for indicating a cause for sending the first message; related information for indicating a core network node where the UE is located; and related information for indicating a node serving the UE and used for location management.

In an embodiment, the sending, to the first node, related information about transmission of the first message may include at least one of: sending, to the first node, the first message; sending, to the first node, a fourth message for requesting a UE context, the UE context including related information for requesting transmission of the first message, and the UE being a UE in an idle mode or inactive state; receiving, from the first node, a fifth message including configuration of a bearer for transmitting the first message; and sending, to the first node, a sixth message, the sixth message including a data unit after the receive operation of the first message through part of protocol layers.

In an embodiment, the sending, to the first node, a data unit after the receive operation of the first message through part of the protocol layers may include: sending, to the first node, a data unit after the receive operation of the first message through common configuration of a protocol of a bearer.

In an embodiment, the method executed by the second node may further include: sending, to the UE, system information; and the system information may include: related information for indicating whether the second node supports transmission of the first message, and related information of random access resource configuration corresponding to a mode of transmission of the first message and/or related information of a transmission block size TBS.

In an embodiment, the sixth message may further include at least one of: related information for indicating whether the sixth message includes the first message and related information for indicating a cause for sending the sixth message.

In an embodiment, the fifth message may include at least one of: related information of transmission configuration of an access stratum (AS) security mode required for receiving the first message; related information of transmission configuration of a radio link control (RLC) layer; and related information for indicating the core network node.

According to still another aspect of the present disclosure, there is provided a method executed by user equipment (UE) in a wireless communication system; and the method may include: receiving, from a first node, configuration of a bearer for transmitting a first message; and sending, to a second node, the first message through the bearer in an idle mode or inactive state.

In an embodiment, the method executed by the UE may further include: sending, to the first node, first capability information, the first capability information indicating a capability of whether the UE supports transmission of the first message in an idle mode or inactive state.

According to another aspect of the present disclosure, there is provided a method executed by user equipment (UE) in a wireless communication system, including: sending, to a node, UE positioning capability information, the node being used for storing and/or acquiring UE positioning capability information; if the UE positioning capability information changes, sending, to the node, updated UE positioning capability information.

According to another aspect of the present disclosure, there is provided a method executed by a first node in a wireless communication system, including: receiving a message from a second node, the message may include a type or a purpose of a message received by the second node from a UE; and deciding, based on the type or the purpose, whether to perform UE context relocation. Wherein, the first node has UE context.

According to yet another aspect of the present disclosure, there is provided a method executed by a second node in a wireless communication system; and the method may include: sending, to a first node, pre-configuration information, so that the first node acquires the pre-configuration information, wherein, the pre-configuration information is generated by the second node.

In one embodiment, the above-described method executed by the second node further includes: sending, to the first node, information for notifying activated or deactivated pre-configuration initiated by the UE.

According to another aspect of the present disclosure, there is provided an electronic device, including: a memory configured to store a computer program; and a controller configured to execute the computer program to implement the method of the present disclosure. The electronic device may be a node or user equipment.

It should be understood that, the various methods described in the present disclosure may be implemented by program instructions stored in a non-transitory computer storage medium, and the program instructions, when executed by one or more processors, cause the one or more processors to execute corresponding steps of the method according to the present disclosure.

Advantageous Effects of Invention

In this way, the information transmission method achieves at least beneficial effects below: the UE in the inactive state or idle mode may exchange security-protected information with the network without the procedure of entering the RRC connection. Therefore, by avoiding making the UE enter the RRC connection procedure, power consumption of the UE is reduced and battery life of the UE is prolonged; meanwhile, delay and signaling overhead of message transmission are reduced by avoiding the RRC connection procedure; in the information transmission method, one or more types of security protection mechanisms may also be supported, which improves security and reliability of information exchange.

MODE FOR THE INVENTION

FIGS. 1 to 20 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

Figure 1:
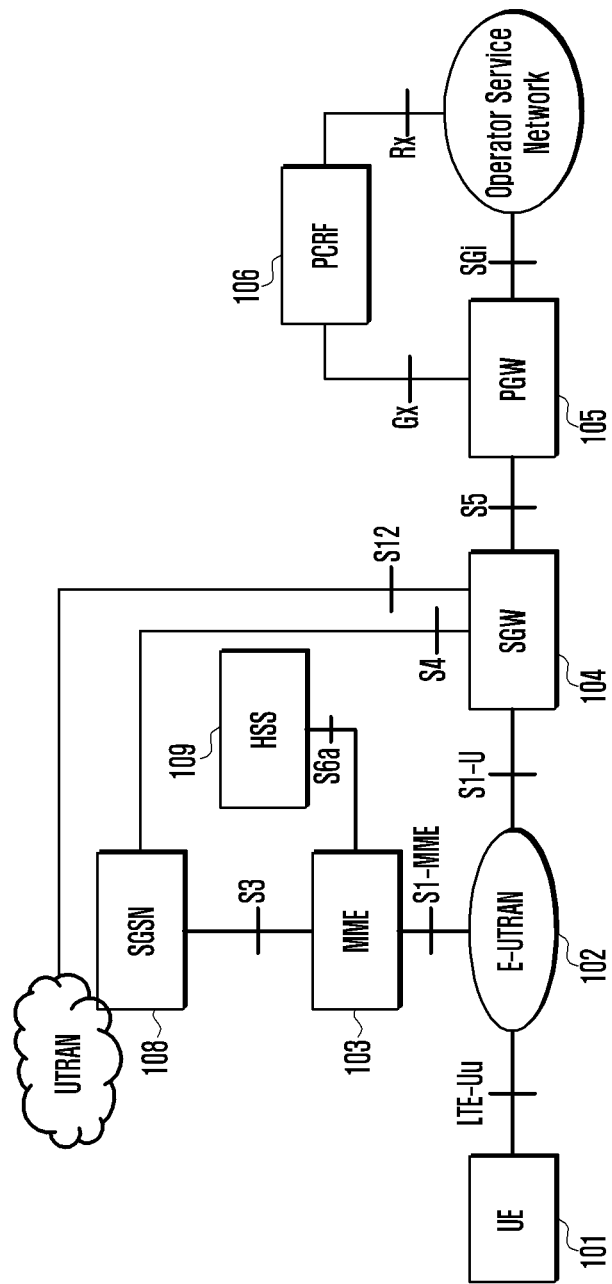
FIG. 1 is an exemplary system architecture of system architecture evolution (SAE).

FIG. 1 is an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QOS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
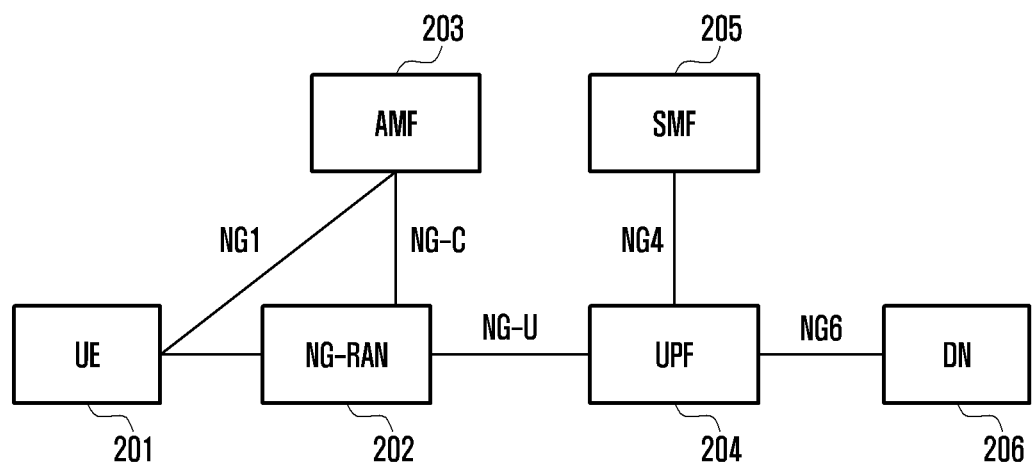
FIG. 2 is an exemplary system architecture according to various embodiments of the present disclosure.

FIG. 2 is an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

With the development needs of wireless technology, in the 5G architecture, functional modules originally located on the same base station are separated, of which some functional modules are getting closer and closer to the user equipment, while other modules are pooled and virtualized for centralized deployment. In other words, the base station can be divided into two parts, one of which is a central unit (CU), and the other part is a distributed unit (DU). The DU is closer to the user equipment, while the CU is far away from the antenna, which can support multiple antenna connections and improve network performance. One CU can be connected to multiple DUs, and the functions on the CU can be virtualized. A CU and a DU are connected through an F1 interface, and the F1 interface is also called a fronthaul interface or a fronthaul connection. The functions of RRC (Radio Resource Control) and PDCP (Packet Data Convergence Protocol) are implemented on the CU, and the functions of RLC (Radio Link Control), MAC (Media Access Control) and the physical layer are implemented on the DU.

With the development of mobile communications and the diversification of services, user equipment positioning has gradually become one of the most important applications in communication networks, the requirements for positioning delay and accuracy are getting higher and higher, especially for IIOT (Industrial Internet of Things) application scenarios, and the demand for positioning of a user equipment in an inactive state or an idle mode is also increasing. In many positioning applications, precise positioning is usually achieved through a combination of multiple technologies, including: 1) solutions based on GNSS (Global Navigation Satellite System); 2) solutions based on wireless technologies (such as LTE networks, Wi-Fi networks, Bluetooth low energy (BLE), ground beacon systems, etc.); and 3) solutions based on inertial measurement units (IMU) or other sensors (for example, tracking the position of the user equipment based on an accelerometer, a gyroscope, and a magnetometer or vertically locating the position of the user equipment through an atmospheric pressure sensor). These technologies are expected to play important roles in realizing accurate user equipment positioning in the future.

The new radio technologies used in NG-RAN, such as rich frequency band resources, larger bandwidth and multi-antenna technology under large-scale antenna arrays, and flexible deployment methods, all provide more freedom and dimensions for enhancing the positioning capabilities of the user equipment and can achieve more accurate user equipment positioning.

Exemplary embodiments of the present disclosure are further described below with reference to the accompanying drawings.

The text and drawings are provided as examples only to help understanding of the present disclosure. They should not be interpreted as limiting the scope of the present disclosure in any way. Although certain embodiments and examples have been provided, based on the disclosure herein, it will be apparent to those skilled in the art that changes may be made to the illustrated embodiments and examples without departing from the scope of the present disclosure.

The present disclosure provides an information transmission method; when the UE in an inactive state or idle mode needs to exchange information (e.g., positioning information) with the network, the information transmission method provided by the present disclosure enables the UE in the inactive state or idle mode to exchange information with the network as well without entering an RRC connection process. Therefore, by avoiding making the UE enter the RRC connection process, power consumption of the UE is reduced and battery life of the UE is prolonged; meanwhile, delay and signaling overhead of message transmission are reduced by avoiding the RRC connection process; in the information transmission method, one or more types of security protection mechanisms may further be supported, which improves security and reliability of information exchange. For example, if the information is positioning-related information, the method implements a positioning function of the UE in an Idle mode or inactive state, so that the network and/or the UE may apply a positioning result to other functions, such as paging, mobility management, network access, etc., in order to better support demands of various business use cases and industrial Internet use cases.

Figure 3:
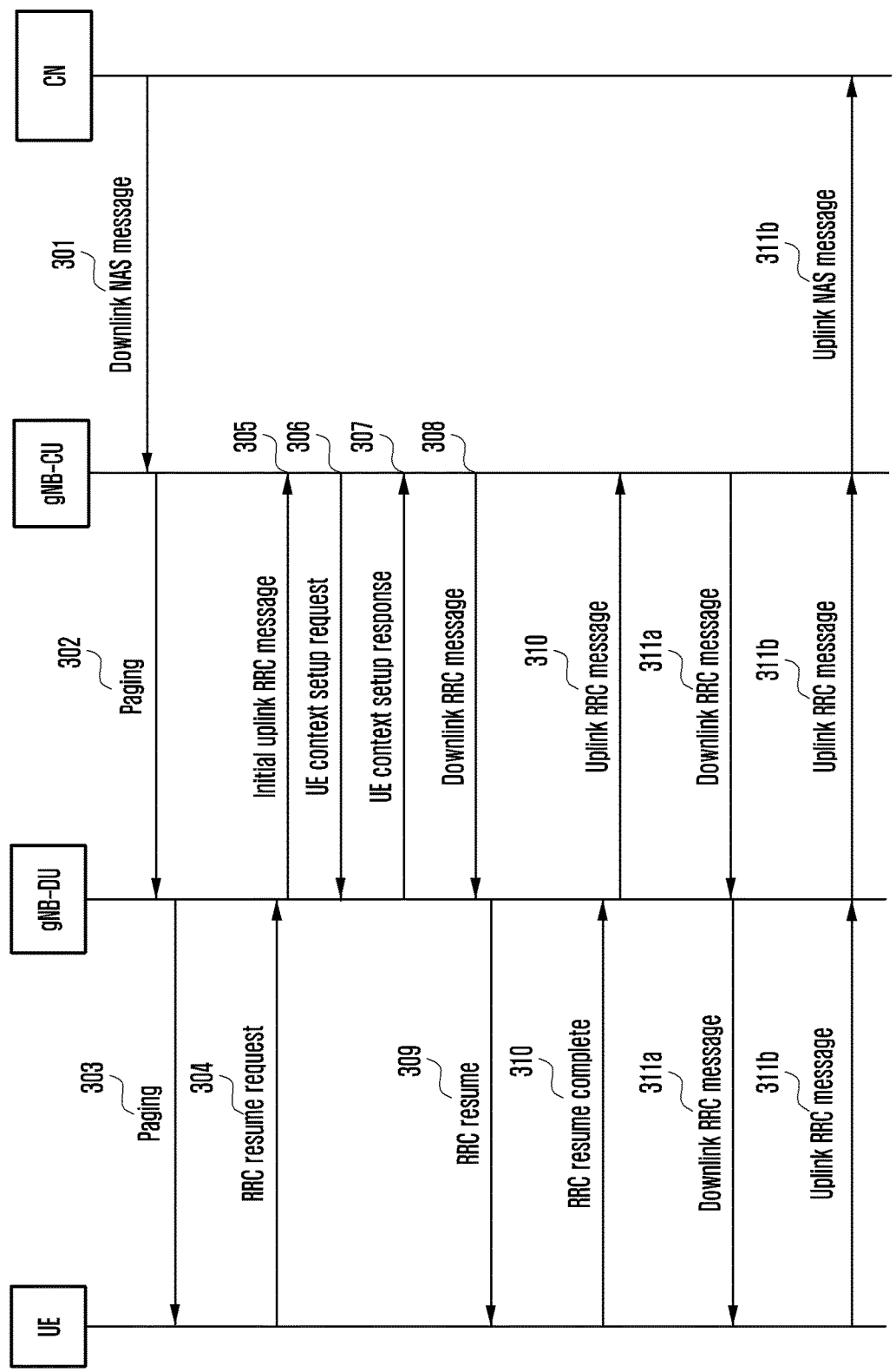
FIG. 3 shows a schematic message flow chart of transmitting and receiving a dedicated non-access-stratum (NAS) signaling message when the UE is in an inactive state under a separated architecture.

FIG. 3 shows a schematic message flow chart of sending and receiving a dedicated non-access-stratum (NAS) signaling message when the UE is in an inactive state under a separated architecture.

As shown in FIG. 3, when the UE is in the inactive state, in step 301, if a downlink NAS message from a core network CN reaches a gNB-CU serving the UE last, then in step 302, the gNB-CU sends a paging message to a gNB-DU. In step 303, the gNB-DU sends a paging message to the UE. After receiving the paging message, the UE knows that a downlink NAS message needs to be received. Alternatively, the UE wants to send a dedicated uplink NAS message to the network. Since the UE is in the inactive state, the UE needs to resume RRC connection before it can receive and send the dedicated NAS message. Through the RRC resume procedure from step 304 to step 309, the UE successfully resumes a RRC connection, that is, a Signaling Radio Bearer (SRB1 or SRB2) for sending and receiving the dedicated NAS message is successfully setup. More specifically, the RRC resume procedure may include steps below: in step 304, the UE sends an RRC resume request message to the gNB-DU. In step 305, the gNB-DU sends an initial UL RRC message to the gNB-CU. In step 308, the gNB-CU sends a downlink RRC message to the gNB-DU. Optionally, the above-described RRC resume procedure further includes that the gNB-CU sends a UE context setup request message to the gNB-DU in step 306, and in response, the gNB-DU sends a UE context setup response message to the gNB-CU in step 307. Thereafter, in step 309, the gNB-DU sends an RRC resume message to the UE, thereby indicating the UE that the RRC connection is resumed successfully. Subsequently, the UE sends an RRC resume complete message to the gNB-DU in step 310. Therefore, the gNB-DU sends an uplink RRC message to the gNB-CU in step 310. In step 311a, if the UE is to receive the downlink NAS message, the downlink NAS message is transmitted via a signaling radio bearer SRB1/SRB2, which may include sending, by the gNB-CU, the downlink RRC message to the UE via the gNB-DU. In step 311b, if the UE is to send the uplink NAS message, the uplink NAS message is transmitted via the signaling radio bearer SRB1/SRB2, which may include sending, by the UE, the uplink RRC message to the gNB-CU via the gNB-DU, and then sending, by the gNB-CU, the uplink NAS message to the CN.

If a node currently serving the UE changes, a new node needs to retrieve UE context information from a last serving node of UE to establish a corresponding bearer and transmit the NAS message.

Figure 4:
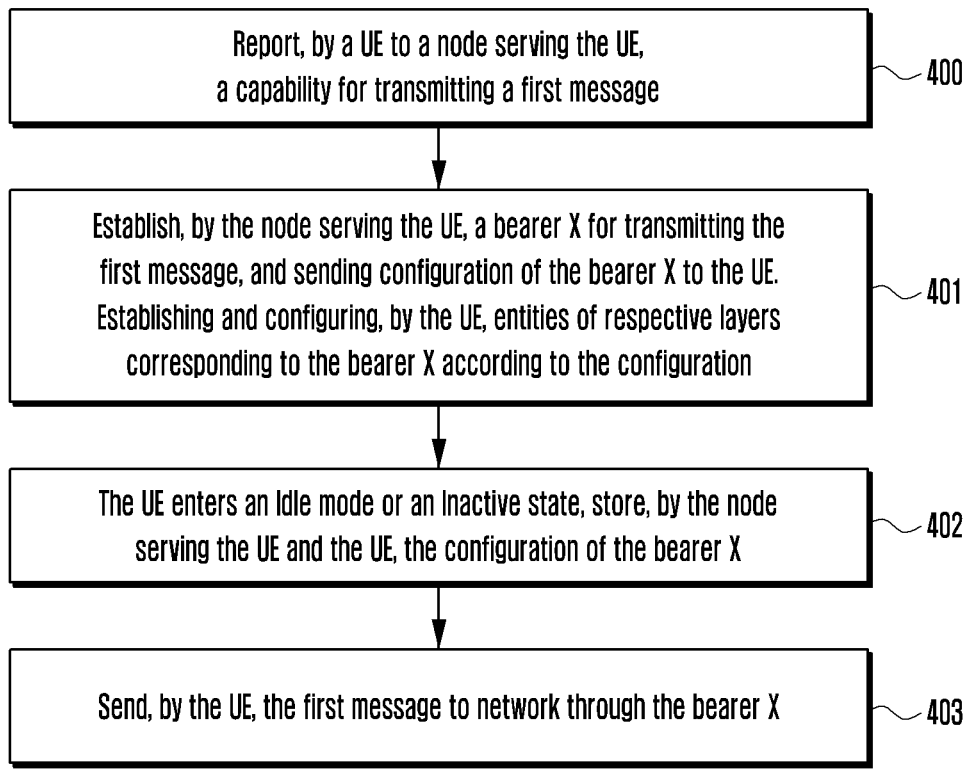
FIG. 4 shows a flow chart of an information transmission method according to an exemplary embodiment of the present disclosure.

An exemplary information transmission method given by the present disclosure is shown in FIG. 4. In order to avoid unnecessarily obscuring the present disclosure, detailed descriptions of steps unrelated to the present disclosure are omitted herein. The method may include steps of:

Step 400: sending, by the UE, first capability information to a node serving the UE. The serving node of the UE may be a base station or a CU or a CU-UP (a user plane part of the CU); and first capability involved in the first capability information refers to a capability of whether the UE supports transmission (including sending and/or receiving) a first message in an idle mode or inactive state, wherein the first message refers to information that the UE in the idle mode or inactive state needs to exchange with the network. In an embodiment, the sending, by the UE, first capability information to a node serving the UE may include reporting, by the UE to the serving node of the UE, a capability of transmitting the first message. The capability may be expressed as a common capability or a list including multiple specific capabilities, wherein each specific capability represents a capability of whether to support a specific function, and the function refers to a function that supports information exchange in an inactive state or idle mode.

Step 401: establishing, by the serving node of the UE, a bearer X for transmitting the first message, and sending configuration of the bearer X to the UE; and establishing and configuring, by the UE, entities of respective layers corresponding to the bearer X according to the configuration. The configuration may be a configuration for establishing the bearer X; the bearer X may be used for transmitting the first message; and the bearer X may also support a security mode and/or an acknowledged mode, so as to improve security and reliability of transmission of the first message; and the bearer X may be an SRB or a DRB transmitted through a common channel. The security mode may be the NAS security mode and/or the AS security mode; and the acknowledged mode may be an acknowledged mode of the RLC layer.

Step 402: the serving node of the UE configures a function of the UE in the idle mode or inactive state, such as a positioning function, when the UE enters the idle mode or inactive state. Meanwhile, the serving node of the UE and the UE need to exchange and store the context configuration of the bearer X for transmission of the first message.

Step 403: if the UE performs the function configured in step 402, and has a first message to exchange with the network, the first message may be transmitted through the bearer X setup in step 401.

In this way, the information transmission method achieves at least beneficial effects below: the UE in the inactive state or idle mode may exchange security-protected information with the network without the procedure of entering the RRC connection. Therefore, by avoiding making the UE enter the RRC connection procedure, power consumption of the UE is reduced and battery life of the UE is prolonged; meanwhile, delay and signaling overhead of message transmission are reduced by avoiding the RRC connection procedure; in the information transmission method, one or more types of security protection mechanisms may also be supported, which improves security and reliability of information exchange. For example, if the information is positioning-related information, the method implements the positioning function of the UE in the idle mode or inactive state, so that the network and/or UE may apply a positioning result to other functions, such as paging, mobility management, network access, etc., in order to better support demands of various business use cases and industrial Internet use cases.

So far, the description of an information transmission method given by the present disclosure is completed. By executing this method, the UE in the inactive state or idle mode may be enabled to exchange security-protected information with the network without entering a connection active state, so that the functions of the UE in the inactive state or idle mode (e.g., the positioning function in the inactive state or idle mode) may be implemented. Meanwhile, this method can reduce unnecessary signaling overhead and connection resource consumption, and can also reduce power consumption of the UE and the network device, thereby increasing revenue of operators.

Figure 5:
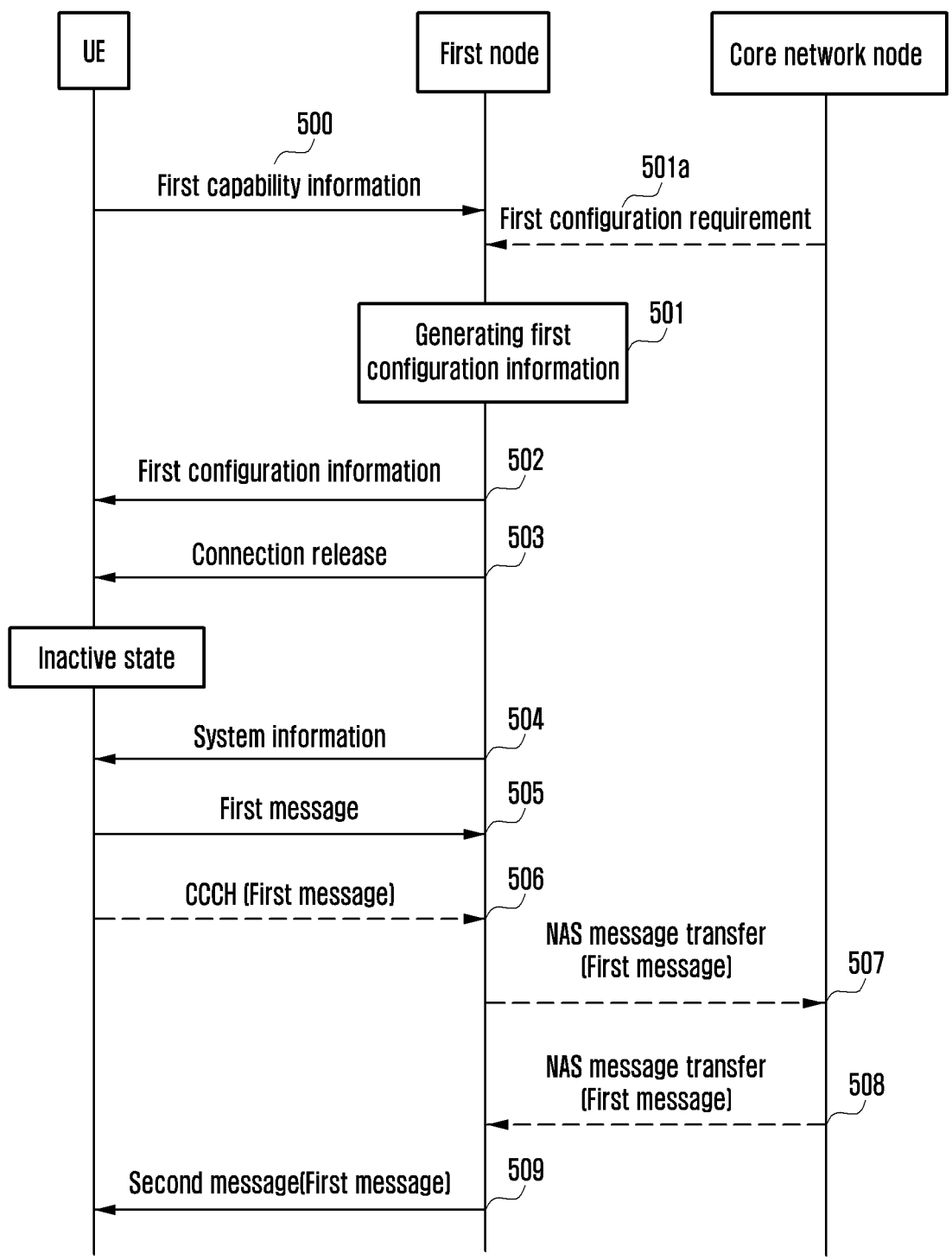
FIG. 5 shows an exemplary message flow diagram of the information transmission method according to an exemplary embodiment of the present disclosure.

Embodiment I of an exemplary information transmission method provided by the present disclosure is as shown in FIG. 5. Detailed descriptions of steps unrelated to the present disclosure are omitted herein. The method may include steps of:

Step 500: sending, by the UE, first capability information to a first node. The first node may be a base station, a CU, or a CU-UP; a first capability involved in the first capability information refers to a capability of whether the UE supports transmitting (including sending and/or receiving) a first message in an inactive state; the capability may be expressed as a common capability or a list including multiple specific capabilities, wherein each specific capability represents a capability of whether to support a specific function, and the function refers to a function that supports information exchange in an inactive state or idle mode.

In the present disclosure, information A is used to represent information that needs transmission and/or exchange in the inactive state or idle mode; and information A may be uplink information or downlink information, and may be transmitted by the first message. The first message may be an AS message, or a NAS message, or an LTE Positioning Protocol (LPP) message encapsulated by NAS, or a message transmitted on UP, or a message in other forms. It is obvious to those skilled in the art that the present disclosure does not limit content and name of the first message, as long as it is information that needs to be transmitted in the inactive state or idle mode. Similarly, types and/or forms of the above-described exemplary messages used for transmitting the first message are listed for illustrative but not limitative purposes, and other types and/or forms of messages may also be used for transmitting the first message without departing from the scope of the present disclosure.

Step 501: generating, by the first node, first configuration information. The first configuration information is configuration information of a bearer supporting transmission of the first message. The first node may decide whether to establish the first configuration information according to its own demand (e.g., a positioning demand) or a first configuration demand from the core network. If the configuration demand comes from a core network node, step 501 may further include sending, by the core network node to the first node, a first configuration demand, wherein the demand refers to requesting the first node to establish the first configuration information, for example, when the core network node needs to configure the positioning function in the inactive state, the demand will be initiated. The demand may be explicit, that is, an indication requesting the first node to establish the first configuration information is directly given; or the demand may also be implicit, that is, to retrieve implicitly through other information. For example, if the core network node sends a function that supports the inactive state (e.g., the positioning function in the inactive state) to the first node, it implicitly indicates that the first node needs to establish the first configuration information.

Step 502: establishing, by the first node, a bearer for transmitting the first message, and sending the first configuration information to the UE. The first configuration information is configuration information of a bearer that supports or is used for transmitting the first message, that is, the first configuration information is configuration information of a radio bearer for transmitting information in the inactive state or idle mode, and the radio bearer supports the UE in exchanging information with the network when it is in an inactive state or idle mode. The radio bearer supporting transmission of the first message may be a Signaling Radio Bearer (SRB) or a Data Radio Bearer (DRB). The first configuration information may be transmitted by an RRC message, and the RRC message may be an RRC release message, or an RRC setup message, or an RRC reconfiguration message, or an RRC resume message, or other RRC messages. The above-described types and/or forms of the RRC messages are only examples, and other types and/or forms of RRC messages may also be used without departing from the scope of the present disclosure.

If the radio bearer for transmitting the first message is an SRB, the SRB may be SRB0, SRB1, SRB2, or a new SRB; in the present disclosure, a SRBx is used to represent this new SRB, and its expression form may be positioning SRB, SRB-pos or pos-SRB or other forms. It should be understood that, the expression form of the new SRB is only an example, and other expression forms may also be used without departing from the scope of the present disclosure. The SRBx differs from SRB0, SRB1 and SRB2 in a processing mode of each protocol layer (e.g., PDCP, RLC, or MAC layer, etc.) thereof. The SRBx is used for exchange of the first message; and the first message may be positioning-related information, or other information that needs to be transmitted in an inactive state or idle mode. To this end, the SRBx has characteristics below:

has a PDCP entity, that is, has a capability of integrity protection and/or encryption;

has a RLC entity, may use a RLC TM (transparent mode) or a RLC AM (acknowledged mode), and may be segmented or not. If the RLC AM is used, common RLC AM or common RLC UM configuration may be used, which means that in a certain area (e.g., RAN-based notification area (RNA), tracking area (TA) or routing area (RA), but not limited thereto), the RLC AM configuration is common, fixed, and/or unchanged, that is to say, even if the UE moves in the area, all nodes in the area may decode the first message on the SRBx according to same RLC AM configuration. The term "decode" used herein refers to how to perform receive operation for the protocol information of a PDU including the first message at each protocol layer; and uses a common control channel CCCH logical channel, or a dedicated control channel DCCH logical channel multiplexed on the CCCH logical channel.

According to the above-described characteristics, the first message on the SRBx is finally transmitted by the CCCH logical channel. In one embodiment, the first message is transmitted by the CCCH. In an embodiment, the first message may be included in Msg3 or MsgA of random access, or other messages using the CCCH.

If the radio bearer for transmitting the first message is a DRB, the present disclosure uses a DRBx to represent a DRB transmitting the first message; and the DRBx is used for the UE in the inactive state or idle mode to transmit (including send and receive) information; the information may be positioning-related information or other information. Those skilled in the art will realize that, although the information transmitted by the DRBx is described by taking positioning-related information as an example, the information transmitted by the DRBx is not limited thereto, and may include other information. In one embodiment, the DRBx may transmit by a CCCH, the RLC TM, or the common RLC AM mode, or the common RLC UM mode may be used.

The content included in the first configuration information is related to a transmission mode of the first message; and as an example, the transmission mode of the first message may be one of various modes below:

Mode 1: the first message is transmitted through SRB0, that is, the RRC message or the NAS message is transmitted on SRB0;

Mode 2: the first message is transmitted through SRB1/2; SRB1/2 has a PDCP entity, uses the RLC AM mode, and uses a DCCH logical channel, wherein the DCCH logical channel will be multiplexed on the CCCH logical channel for transmission;

Mode 3: the first message is transmitted through a SRBx; the SRBx has a PDCP entity, uses RLC TM or common RLC AM mode or common RLC UM mode, wherein the RLC mode may be segmented or not; and uses the CCCH logical channel or the DCCH logical channel, wherein if the DCCH logical channel is used, the DCCH logical channel will be multiplexed on the CCCH logical channel for transmission; and Mode 4: the first message is transmitted through a DRBx; the DRBx has a PDCP entity, uses RLC TM or common RLC AM mode or common RLC UM mode, and uses dedicated traffic channel DTCH logical channel, wherein the DTCH logical channel will be multiplexed on the CCCH logical channel for transmission.

The content included in the first configuration information needs to include entities (e.g., PDCP, RLC, etc.) corresponding to DRBs/SRBs that need to be established in the above-described modes, and mapping and multiplexing relationships between channels, etc.

The UE receives the first configuration, and establishes and configures entities of respective layers corresponding to the bearer for transmitting the first message according to the first configuration.

Step 503: sending, by the first node, a connection release message to the UE. The connection release message may be an RRC release message or other RRC messages. Those skilled in the art will realize that although the connection release message is described by taking the RRC release message as an example, the connection release message is not limited thereto, and other RRC messages may also be used. The connection release message may include suspend configuration to indicate the UE to enter an RRC_inactive state. The connection release message may further include information related to the first configuration information. In one embodiment, if the mode supporting transmission of the first message includes security-related configuration (e.g., modes 2, 3 and 4 include the PDCP entity, that is, security protection such as encryption and/or integrity protection may be performed), then the security-related configuration may include AS security information, for example, a count used for AS security algorithms.

Step 502 and step 503 may occur simultaneously, or may occur in an order that step 502 occurs firstly and step 503 occurs subsequently. If step 502 and step 503 occur simultaneously, a same RRC message may be used to send the first configuration information and the connection release message in step 502 and step 503.

Thereafter, the UE enters to the inactive state and has a first message to send.

Step 504: sending, by the first node, system information. The UE reads the system information, and the system information includes at least one of information below:

A first indication, to indicate whether a cell supports transmission of the first message; and the first indication may be one indication or multiple indications. If the first indication is one indication, it means that both the first node and the UE have known a mode for transmitting the first message; if the first indication are multiple indications, it means that there are multiple modes for transmitting the first message, for example, the 4 modes mentioned in step 501; there is a value for each mode to indicate whether the cell supports transmission of the first message in the mode; in one embodiment, if a value for one mode is true, it means that the mode is supported to be used for transmission of the first message; otherwise, it means that the mode is not supported to be used for transmission of the first message. It should be understood that, the above-described embodiment using whether the value is "true" to represent whether a certain mode is supported to be used for transmission of the first message is only an example, and other ways (e.g., binary values, etc.) may also be used to represent whether a certain mode is supported to be used for transmission of the first message without departing from the scope of the present disclosure;

A random access resource configuration corresponding to the mode of transmitting the first message (e.g., a preamble code and/or a physical random access channel PRACH time-frequency resource, etc.); if the UE wants to transmit the first message, it needs to initiate a random access process according to the random access resource configuration;

Transmission Block Size (TBS) information, and the TBS information is used for indicating a TBS size occupied by the first message in msg3 or msgA.

Step 505: sending, by the UE in the inactive state, a first message to the first node. According to configurations of different modes in step 501, specific transmission modes of the first message are as follows:

Mode 1: the first message will be sent through SRB0; the first message may be an existing RRC message or a new RRC message, such as an RRCInactiveSignallingRequest or an RRCSmallDataRequest. It should be understood that, the name of the new RRC message is only an example, and other message names may also be used without departing from the scope of the present disclosure. In an embodiment, the first message may be included in msg3 or msgA of random access. As an example, specific signaling bearer, protocol configuration, and logical channel configuration are as follows:

Signaling bearer: SRB0;
RLC-Service Access Point (RLC-SAP): TM;
Logical channel: CCCH;

Mode 2: the first message will be sent through SRB1 or SRB2; and the first message may be an RRC message, such as an Uplink NAS transfer message. It should be understood that, the name of the first message is only an example, and other message names may also be used without departing from the scope of the present disclosure. The first message may be included in msg3 or msgA of random access. As an example, specific signaling bearer, protocol configuration, and logical channel configuration are as follows:

Signaling bearer: SRB1/2;
PDCP: AS encryption and/or integrity protection;
RLC-SAP: AM, with or without segmentation;
Logical channel: DCCH (the DCCH is multiplexed onto a CCCH);

Mode 3: the first message will be sent through a SRBx; and the first message may be an RRC message, such as an uplink NAS transfer message, or other RRC messages. It should be understood that, the name of the first message is only an example, and other message names may also be used without departing from the scope of the present disclosure. The first message may be included in msg3 or msgA of random access. As an example, the specific signaling bearer, protocol configuration, and logical channel configuration are as follows:

Signaling bearer: SRBx;
PDCP: AS encryption and/or integrity protection;
RLC-SAP: common RLC AM or common RLC UM or RLC TM;
Logical channel: CCCH;

Mode 4: the first message is a message on the UP and is sent through a DRBx; and the first message may be included in msg3 or msgA of random access. As an example, specific signaling bearer, protocol configuration, and logical channel configuration are as follows:

Signalling bearer: DRBx;
PDCP: AS encryption and/or integrity protection;
RLC-SAP: common RLC AM or common RLC UM or RLC TM, with or without segmentation;
Logical channel: CCCH or DCCH (the DCCH is multiplexed onto the CCCH);

The first node receives the first message. The first message may include at least one of an access stratum AS message, a NAS message, and a message on the user plane. The AS message may include an RRC message. The above-described categories of the first message are only examples, and the first message may also be a message of other categories without departing from the scope of the present disclosure. If the first message is an AS message, the first node may directly read the content in the first message; if the first message is a NAS message, the first node needs to transmit the NAS message to the core network node; and if the first message is a message on the UP, the first node may convert the message on the UP into a CP message, and read or forward the CP message.

The first message may also include at least one of information below:

a first cause, indicating a cause for sending the first message; the cause may be a resume cause; and the resume cause may be that there is information to be transmitted in the inactive state or idle mode, that is, transmission of the first message;

a Serving-Temporary Mobile Subscriber Identity (S-TMSI), for indicating an ID of the core network where the UE is located, including information of the core network serving the UE, so as to transmit the first message to the corresponding core network node when necessary (e.g., the first message is a NAS message);

an AMF ID, for indicating the AMF serving the UE, so as to transmit the first message to the AMF when necessary (e.g., the first message is a NAS message);

an LMF ID, for indicating the LMF serving the UE, so as to transmit the first message to the LPP when necessary (e.g., the first message is an LPP message);

Step 506: if a size of the first message exceeds the size indicated by the TBS information in step 504 or other messages or configuration, the first message may be segmented, that is, transmitted multiple times, each time by the CCCH logical channel. Step 506 may be a process in which the first message is segmented for transmission.

Step 507: if the first message is a NAS message, sending, by the first node, the NAS message to the core network node; wherein the first node may know which core network node the NAS message is to be sent to according to the S-TMSI and/or AMF ID and/or LMF ID in the first message, or the first node may also select a core network node according to information in the UE context or other information (e.g., load of the core network node, etc.). The NAS message may be transmitted through an initial UE message, or transmitted through a uplink NAS transfer message. It should be understood that, the above-described message names for transmitting the NAS message are only examples, and other messages may also be used for transmitting the NAS message without departing from the scope of the present disclosure. The NAS message may include the first message. In an embodiment, in order to indicate whether the NAS message includes the first message, the NAS message may further include information below:

a second indication, for indicating whether the NAS message includes the first message. The second indication may be an explicit indication given directly, or may also be implicit information. If the first message is included in the NAS message and is supported by the core network node, the core network node will consider the received NAS message includes the first message, and perform receive operation for the NAS message according to situations (e.g., necessity to perform NAS stratum security procedures, such as decryption and/or integrity verification). The second indication may use an expression form of Signaling Transmission Indication (STI) session or Small Data Transmission (SDT) session; and it should be understood that, the second indication may also use other expression forms without departing from the scope of the present disclosure.

Step 508: if the core network node has a first message to response or send to the UE, forwarding, by the core network node, the first message to the first node through the NAS message transmission procedure. In an embodiment, the first message may be configuration information or notification information, etc. related to positioning of the UE. In an embodiment, the NAS message may further include an indication of whether the core network node has more information to send. Or, the core network node may trigger a connection setup procedure.

Step 509: if there is no more first messages to send, the first node may send a second message on the CCCH to keep the UE in the inactive state. If the first message sent by the core network node is received in step 508, the first message is included in the second message. The mode of transmitting the downlink first message is similar to the description in step 505. The second message may be an RRC release message or other RRC messages. That is, the name of the second message is not limited to the RRC release message, and other message names may also be used without departing from the scope of the present disclosure.

In this way, the information transmission method achieves at least beneficial effects below: the UE in the inactive state or idle mode may exchange security-protected information with the network without entering the procedure of the RRC connection. Therefore, by avoiding making the UE enter the RRC connection procedure, power consumption of the UE is reduced and battery life of the UE is prolonged; meanwhile, delay and signaling overhead of message transmission are reduced by avoiding the RRC connection procedure; in the information transmission method, one or more types of security protection mechanisms may also be supported, which improves security and reliability of information exchange. For example, if the information is positioning-related information, the method implements the positioning function of the UE in the idle mode or inactive state, so that the network and/or UE may apply a positioning result to other functions, such as paging, mobility management, network access, etc., in order to better support demands of various business use cases and industrial Internet use cases.

So far, the description of an information transmission method given by the present disclosure is completed. By this method, the UE in the inactive state or idle mode may be enabled to exchange security-protected information with the network without entering a connection active state, so that the specific functions of the UE in the inactive state or idle mode may be implemented (e.g., the positioning function in the inactive state or idle mode). Meanwhile, this method may reduce unnecessary signaling overhead and connection resource consumption, and may also reduce power consumption of the UE and the network device, thereby increasing revenue of operators.

Figure 6:
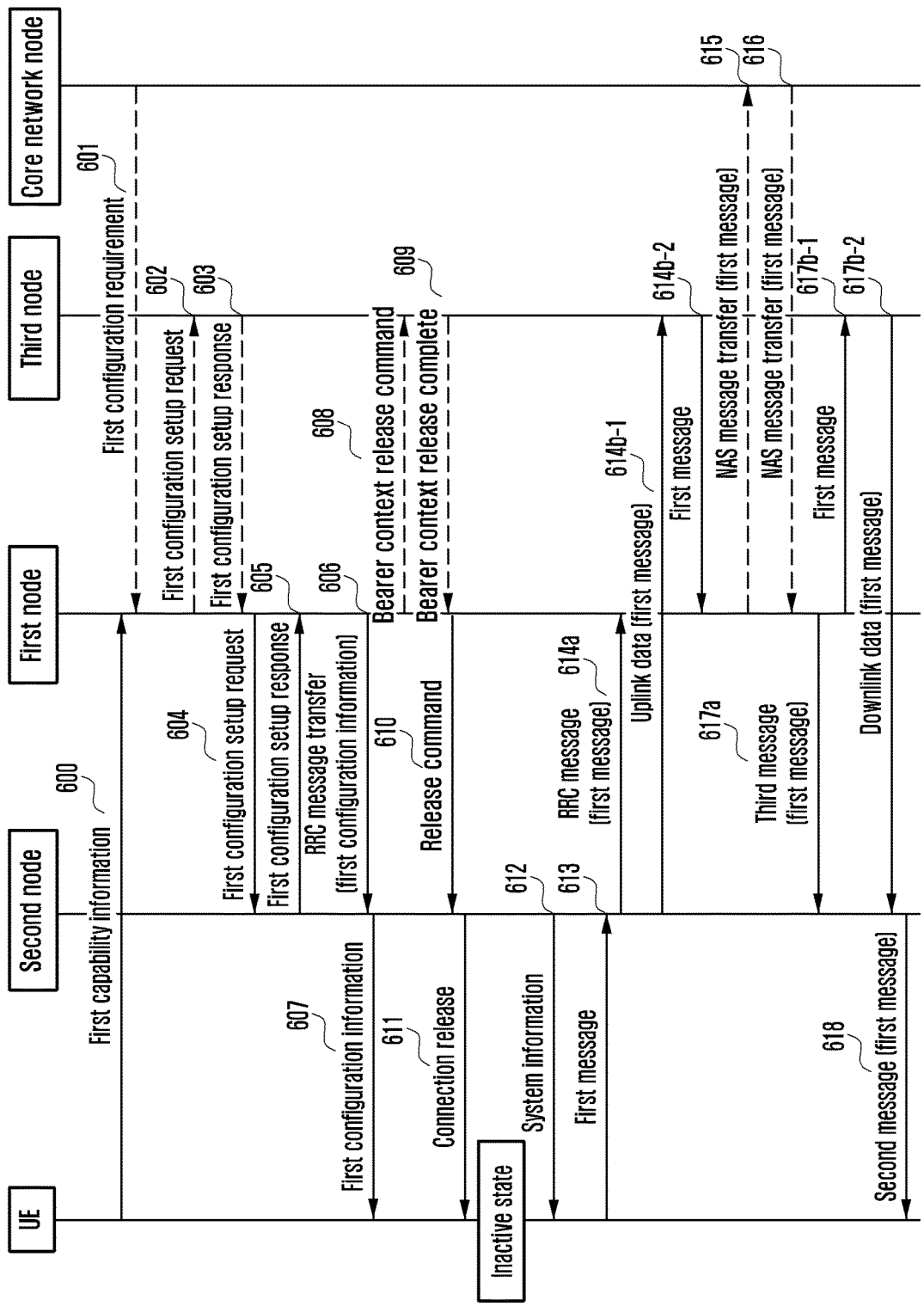
FIG. 6 is an exemplary message flow diagram of the information transmission method implemented according to the separated architecture of nodes according to an exemplary embodiment of the present disclosure.

Embodiment II of the exemplary information transmission method given by the present disclosure is as shown in FIG. 6. Embodiment II shown in FIG. 6 differs from Embodiment I shown in FIG. 5 in that the exemplary information transmission method is described in detail according to the separated architecture of the nodes. Detailed description of steps unrelated to the present disclosure is omitted here. The method may include steps of:

Step 600 and step 601 are consistent with the description of step 500 and step 501, and no details will be repeated here. The entities involved in steps 600 and 601 include the UE, the first node, and the core network node. The first node may be a base station, a CU, or a CU-CP.

The first node decides to establish a bearer for transmitting the first message, and sends first configuration to the UE; the first configuration is related configuration for establishing a bearer for transmitting the first message; the UE receives the configuration; and the UE establishes and configures entities of respective protocol layers corresponding to the bearer for transmitting the first message according to the configuration.

Step 602: if the first configuration uses the mode 4 in step 502, that is, it is decided to use a DRB to transmit the first message, then the first node sends to the third node a first configuration setup request, to request setup of a DRB to transmit the first message. The first node is a CU-CP; the third node is a CU-UP; the first configuration setup request may be transmitted by a bearer context setup request message, or a bearer context modification request message or a bearer context release message. It should be understood that, although the above-described names of the messages for transmitting the first configuration setup request are given, this does not mean a limitation, but other messages may also be used for transmitting the first configuration setup request, without departing from the scope of the present disclosure. The content in the message may include at least one of:

a special DRB indication, to indicate that the DRB that needs to be setup is different from other DRBs used for transmission services, and is a DRB used for transmitting the first message. Information of the DRB may be read by the CU-UP and transmitted to the CU-CP. The DRB may have a corresponding PDU session or no corresponding PDU session, or the PDU session may be fake or empty; and the indication may be expressed in DRBx or other specific modes;

Step 603: establishing, by the third node in response to receiving the first configuration setup request from the first node and according to the content of the first configuration setup request, an entity and a channel corresponding to the DRB bearer; if the entity and the channel are successfully setup, the third node sends a first configuration setup response to the first node in step 603; the purpose of the response is to notify the first node whether the bearer (including the entity and the channel corresponding thereto) requested in step 602 is successfully setup. The response may be transmitted by a bearer setup response message, or a bearer modification response message, or a bearer release complete message. It should be understood that, although the above-described names of the messages for transmitting the first configuration setup response are given, this does not mean a limitation, but other messages may also be used for transmitting the first configuration setup response without departing from the scope of the present disclosure. The response may further include information about the DRB successfully setup.

Step 604: sending, by the first node, a first configuration setup request to a second node, wherein the first node is a CU-CP or a CU, and the second node is a DU. The purpose of the first configuration setup request is to notify the second node to establish a bearer that supports transmission of the first message; there may be 4 types of bearers that support transmission of the first message, which respectively correspond to the 4 transmission modes of the first message in step 502; according to different transmission modes, contents of the first configuration setup request are different. The request may be transmitted by a UE context setup request message, or a UE context modification request message, or a UE context release command message. It should be understood that, although the above-described names of the messages for transmitting the first configuration setup request are given for illustrative purposes, this does not mean a limitation, and other messages may also be used for transmitting the first configuration setup request, without departing from the scope of the present disclosure. The content of the request may specifically include at least one of:

an SRB ID or a DRB ID, to indicate an SRB or a DRB that needs to be setup;

a RLC mode, indicating the RLC mode required by an SRB or a DRB, which may be an AM mode, a UM mode or a TM mode;

a RLC common indication, to indicate that the SRB or DRB needs to establish a common RLC configuration, and the configuration does not change in a certain area;

a logical channel multiplexing indication, indicating that the dedicated logical channel (e.g., DCCH or DTCH) corresponding to the SRB or DRB bearer may be multiplexed onto a common logical channel (e.g., CCCH).

Step 605: establishing, by the second node, in response to receiving the first configuration setup request from the first node and according to the content of the first configuration setup request, an entity and a channel (e.g., the RLC entity and the logical channel, etc.) corresponding to the bearer; if the entity and the channel are successfully setup, the second node sends a first configuration setup response to the first node; the purpose of the first configuration setup response is to notify the first node whether the bearer (including the entity and the channel corresponding thereto) requested in step 604 is successfully setup. The first configuration setup response may be transmitted by a UE context setup response message, a UE context modification response message, or a UE context release complete message. It should be understood that, although the above-described names of the messages for transmitting the first configuration setup response are given for illustrative purpose, this does not mean a limitation, but other messages may also be used for transmitting the first configuration setup response without departing from the scope of the present disclosure. The first configuration setup response may further include related configuration parameters, such as a logical channel ID (LCID) and other information.

Step 606: generating, by the first node, first configuration information according to the response information in step 603 or step 605. The first configuration information is consistent with the description in step 502, and no details will be repeated here. The first node puts the first configuration information into the RRC message and sends the same to the second node.

Step 607: sending, by the second node, the first configuration information to the UE.

Step 608: sending, by the first node, a bearer context release command to the third node; the bearer context release command may be transmitted by a bearer context release command message, a bearer context modification message, or other messages. It should be understood that, although the above-described names of the messages for transmitting the bearer context release command are given for illustrative purpose, this does not mean a limitation, but other messages may also be used for transmitting the bearer context release command without departing from the scope of the present disclosure. The message including the bearer context release command may include at least one of information below:

an exception configuration indication, the exception configuration indication may indicate an unreleased DRB, a reserved DRB or an exceptional DRB. In one embodiment, the exception configuration indication may include IDs of one or more unreleased or exceptional or reserved bearers, such as DRB IDs, wherein the unreleased, exceptional and reserved cases all represent notifying the third node to save the context of the corresponding DRB, so as to use the DRB to transmit the first message in the inactive state;

an inactive state transmission indication; if the third node knows which bearers are used for information transmission in the inactive state, the inactive state transmission indication may give an indication of all (or one or more of) the bearers reserved for information transmission in the inactive state, to indicate to the third node the configuration information not to release the bearers used for information transmission in the inactive state, or to reserve the bearers used for information transmission in the inactive state; the inactive state transmission indication may be a single indication, or may also be multiple indications for each of the corresponding bearers. In one embodiment, the inactive state transmission indication may be a transmission in inactive state, or a cause; the cause is a cause why the bearer is not released; and the cause can indicate that transmission of the first message needs to be supported, or be in other forms.

After receiving the message including the bearer context release command, the third node will stores the context of the DRB indicated in the message.

Step 609: after storing the indicated DRB context, the third node may send a bearer context release complete message to the first node to notify the first node that release of the bearer context has been completed.

Step 610: sending, by the first node, a release command to the second node. The release command may include an indication for the UE to enter the inactive state; and the release command may be transmitted by a UE context release command message or a bearer context release message, or a UE context modification request message or a bearer context modification message, or other messages. It should be understood that, although the above-described names of the messages for transmitting the release command are given for illustrative purposes, this does not mean a limitation, and other messages may also be used for transmitting the release command, without departing from the scope of the present disclosure. The message including the release command may include at least one of:

an exception configuration indication, the exception configuration indication may indicate unreleased DRBs/SRBs, reserved DRBs/SRBs or exceptional DRBs/SRBs, including IDs of one or more unreleased or exceptional or reserved bearers, such as SRB IDs or DRB IDs, wherein the unreleased, exceptional and reserved cases all represent notifying the second node to save the context of the corresponding DRBs/SRBs, so as to use the DRBs/SRBs to transmit the first message in the inactive state;

an inactive state transmission indication; if the second node knows which bearers are used for information transmission in the inactive state, the inactive state transmission indication may give an indication of all (or one or more of) the bearers reserved for information transmission in the inactive state, to indicate to the second node the configuration information not to release the bearer used for information transmission in the inactive state, or to reserve the bearer used for information transmission in the inactive state; the inactive state transmission indication may be a single indication, or may also be multiple indications for each of the corresponding bearers. In one embodiment, the inactive state transmission indication may be a transmission in inactive state, or a cause; the cause is a cause why the bearer is not released; and the cause may indicate that transmission of the first message needs to be supported, or be in other forms.

an RRC container, the RRC container includes a connection release message; the connection release message may be an RRC release message; and a specific content included in the connection release message is as described in step 503.

After receiving the message including the release command, the second node will store the context of the SRB or DRB indicated in the message.

Step 611: sending, by the second node, the connection release message in the RRC container to the UE; the connection release message may be an RRC release message or other RRC messages.

The UE receives the connection release message and enters the inactive state.

In the above-described process, step 602 to step 603 and step 608 to step 609 may occur simultaneously, or step 602 to step 603 occur firstly, and step 608 to step 609 occur subsequently. If step 602 to step 603 and step 608 to step 609 occur simultaneously, they will use a same message.

In the above-described process, step 606 and step 610 may occur simultaneously, or step 606 occurs firstly, and step 610 occurs subsequently. If step 606 and step 610 occur simultaneously, step 606 and step 610 will use a same message.

Step 612: sending, by the second node, system information to the UE, and reading, by the UE, the system information. The content included in the system information is as described in step 504, and no details will be repeated here.

Step 613: sending, by the UE, a first message to the second node. The first message may be Msg3 or MsgA of random access. It should be understood that, although the above-described names of the messages for transmitting the first message are given for illustrative purposes, this does not mean a limitation, but other messages may also be used for transmitting the first message without departing from the scope of the present disclosure. The first message is sent through the CCCH logical channel, a specific process and content are as described in steps 505 and 506, and no details will be repeated here.

Step 614: receiving, by the second node, the first message, and the random access configuration corresponding to the first message that is used by the UE implicitly indicates that the first message is included. If the random access configuration cannot implicitly indicate whether the first message is included, the first message further needs to include an indication of whether the first message is included; the indication is an indication that the second node can perform receive operation for protocol data units of respective layers (e.g., the MAC layer or the RLC layer). If the first message is included, the second node will perform receive operation for a protocol data unit of a lower layer (e.g., the MAC layer, the RLC layer) in the first message according to the first configuration information, and transmit the first message after the receive operation to the first node through the RRC message or send the same to the third node through data transmission. Referring to FIG. 6, the step 614 may include step 614a or steps 614b-1 and 614b-2 below.

Step 614a: if the first message is transmitted by the SRB, transmitting, by the second node, the message including the first message to the first node through an RRC message; wherein the RRC message may be an initial UE RRC message, or an uplink RRC message, or other messages. It should be understood that, although the above-described names of the messages for transmitting the message including the first message are given for illustrative purposes, this does not mean a limitation, but other messages may also be used for transmitting the message including the first message without departing from the scope of the present disclosure. The message including the first message may include information below:

a second indication, for indicating whether the message includes the first message. If the first message is included in the message, and if it is supported by the first node, the received RRC message will be considered to include the first message, and the RRC message or data will be handled by receive operation according to the first configuration information (e.g., AS stratum security procedures, e.g., decryption and/or integrity verification, needs to be performed). The second indication may use an expression form of a STI session or a SDT session, and it should be understood that, the second indication may also use other expression forms without departing from the scope of the present disclosure.

Step 614b-1: if the first message is transmitted by the DRB and the third node is a CU-UP, sending, by the second node, the data including the first message to the third node. The third node knows that the data includes the first message according to an implicit or direct (explicit) indication, and receive the data including the first message according to the configuration of the bearer.

Step 614b-2: sending, by the third node, the received data including the first message to the first node or sending directly to the core network node according to the configuration.

Step 615 to step 616 are consistent with the process and content of step 507 to step 508, and no details will be repeated herein.

Step 617: if the NAS message transmitted in step 616 includes the first message that the core network node wants to send to the UE, or the first node has a first message to respond or send to the UE, sending, by the first node, the first message to the second node through the third message (step 617a), or forwarding, by the first node, the first message to the second node through the third node (steps 617b-1 and 617b-2); wherein the third message may be a downlink RRC message or an RRC context release command message. It should be understood that, although the above-described names of the messages for transmitting the third message are given for illustrative purposes, this does not mean a limitation, but other messages may also be used for transmitting the third message without departing from the scope of the present disclosure. The third message may further include information below:

second indication, for indicating whether the third message includes the first message. If the first message is included in the third message, and if it is supported by the second node, the third message is handled according to the first configuration information.

Step 618: the second node sends a second message including the first message to the UE, which is consistent with the content of step 509, and no details will be repeated herein.

In this way, the information transmission method achieves at least beneficial effects below: in a separated network architecture (including separation of a CU and a DU, and/or separation of a CU-CP and a CU-UP), the UE in the inactive state or idle mode may exchange security-protected information with the network without entering the procedure of the RRC connection, and even in the separated network architecture, the security-protected information can be handled by receive operation quickly. Therefore, by avoiding making the UE enter the RRC connection procedure, power consumption of the UE is reduced and battery life of the UE is prolonged; meanwhile, delay and signaling overhead of message transmission are reduced by avoiding the RRC connection procedure; in the information transmission method, one or more types of security protection mechanisms may also be supported, which improves security and reliability of information exchange. For example, if the information is positioning-related information, the method implements the positioning function of the UE in idle mode or inactive state, so that the network and/or UE may apply the positioning result to other functions, such as paging, mobility management, network access, etc., in order to better support demands of various business use cases and industrial Internet use cases.

So far, the description of an information transmission method given by the present disclosure is completed. By this method, even in a separated network architecture, the UE in the inactive state or idle mode may be enabled to exchange security-protected information with the network without entering a connection active state, so that specific functions of the UE in the inactive state or idle mode may be implemented (e.g., the positioning function in the inactive state or idle mode). Meanwhile, this method may reduce unnecessary signaling overhead and connection resource consumption, and may also reduce power consumption of the UE and the network device, thereby increasing revenue of operators.

Figure 7:
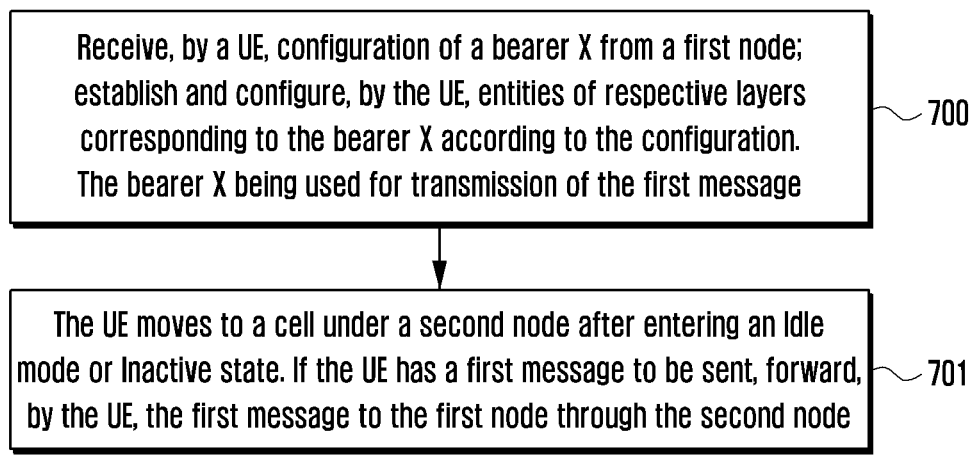
FIG. 7 shows a flow chart of another information transmission method according to an exemplary embodiment of the present disclosure.

Another exemplary information transmission method given by the present disclosure is as shown in FIG. 7. In order to avoid unnecessarily obscuring the concept of the present disclosure, detailed descriptions of steps irrelevant to the present disclosure are omitted herein. The exemplary information transmission method may include steps of:

Step 700: receiving, by a UE, configuration of a bearer X from a first node, establishing and configuring, by the UE, entities of respective layers corresponding to the bearer X according to the configuration, the bearer X being used for transmission of the first message. The UE and the first node establish the bearer X for transmitting the first message. The first node is the last serving node of UE, as described in step 400 to step 402.

Step 701: the UE moves to a cell under a second node after entering the idle mode or inactive state; wherein, the second node may be a base station, a CU, or a CU-CP. If there is a first message to be sent, the UE may read the system information of the cell under the second node; the system information may include information such as whether the second node supports transmission of the first message and common configuration, etc.; and the UE sends the first message to the second node according to the system information. Since the second node does not have a UE context, it can only perform receive operation for a protocol data unit at a lower layer (such as the MAC layer and/or the RLC layer) of the first message including the first message. The second node transmits to the first node the bearer X including the first message and having not performed receive operation completely; and the first node continues to perform receive operation for the bearer X including the first message according to the UE context, and decides to further forward the first message to the core network node according to the type of the first message (if the first message is generated according to the function configured by the core network node).

In this way, the information transmission method achieves at least beneficial effects below: in the inactive state or idle mode, the UE moves to a new serving node, and may exchange security-protected information with the network through the new serving node and the previous serving node without entering the procedure of the RRC connection, and can quickly perform receive operation for security-protected information even in a separated network architecture. Therefore, by avoiding making the UE enter the RRC connection procedure, power consumption of the UE is reduced and battery life of the UE is prolonged; meanwhile, delay and signaling overhead of message transmission are reduced by avoiding the RRC connection procedure; in the information transmission method, one or more types of security protection mechanisms may also be supported, which improves security and reliability of information exchange. For example, if the information is positioning-related information, the method implements the positioning function of the UE in the idle mode or inactive state, so that the network and/or UE may apply a positioning result to other functions, such as paging, mobility management, network access, etc., in order to better support demands of various business use cases and industrial Internet use cases.

So far, the description of another information transmission method given by the present disclosure is completed. By this method, the UE in the inactive state or idle mode, even in a case where it moves to a new serving node, can exchange security-protected information with the network through the new serving node and the previous serving node even if there is no UE-related connection context between the new serving node and the core network, so that specific functions of the UE in the inactive state or idle mode may be implemented (e.g., the positioning function in the inactive state or idle mode). Meanwhile, this method may reduce unnecessary signaling overhead and connection resource consumption, and may also reduce power consumption of the UE and the network device, thereby increasing revenue of operators.

Figure 8:
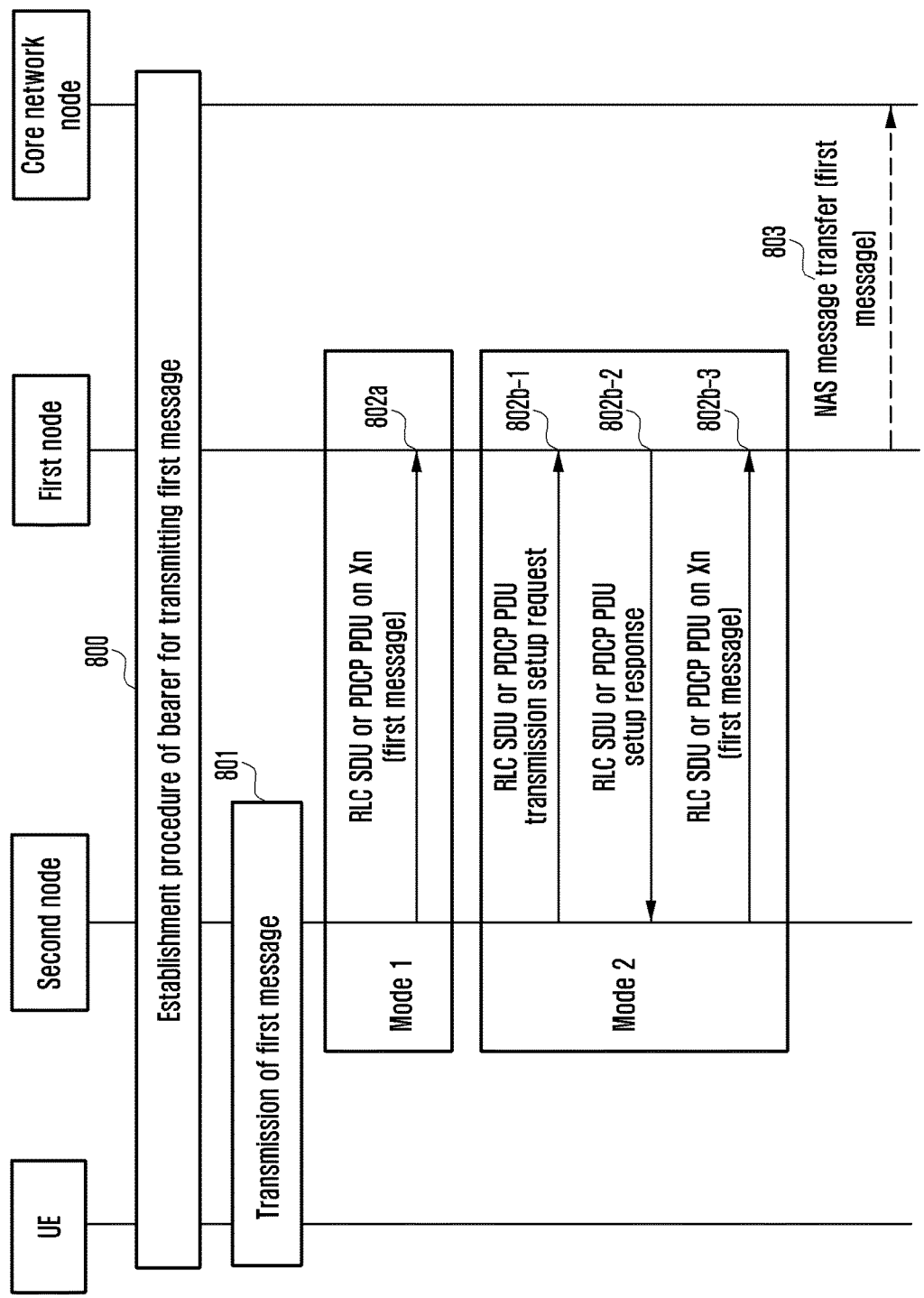
FIG. 8 shows an exemplary message flow diagram of the another information transmission method according to an exemplary embodiment of the present disclosure.

Embodiment I of the another exemplary information transmission method provided by the present disclosure is as shown in FIG. 8. In order to avoid unnecessarily obscuring the concept of the present disclosure, detailed descriptions of steps irrelevant to the present disclosure are omitted herein. The Embodiment I may include steps of:

Step 800: a bearer establishment procedure for transmitting the first message, in which participating nodes being a UE, a first node, and a core network node; the bearer establishment procedure being that the serving node of the UE needs to send the first configuration to the UE and other nodes serving the UE; and the UE and other nodes serving the UE receiving the first configuration establish and configure entities of respective protocol layers corresponding to the bearer according to the first configuration. The first configuration refers to configuration of the bearer that supports transmission of the first message, and specific steps and content are as described in step 500 to step 503 or described in step 600 to step 607. Wherein, the first node is a base station or a CU or a CU-CP; and the first node is a last serving node of UE, and having UE context information and/or core network node connections stored therein.

Step 801: transmitting, by the UE, the first message to a second node. The second node is a base station, a CU or a CU-CP. If the second node is a base station, a transmission mode of the first message may be as described in step 504 to step 505; if the second node is a CU or a CU-CP, a transmission mode of the first message may be as described in step 612 to step 614. Different from the first node, the second node is not a last serving cell of the UE, that is, the second node does not have the context information of the UE; due to use of a CCCH channel and a RLC TM mode or a common RLC AM mode or a common RLC UM mode, the second node can receive by itself or obtain a RLC SDU or a PDCP PDU including the first message through the DU under the second node.

Step 802: sending, by the second node to the first node, a data unit after the receive operation of the first message through part of the protocol layers. In an embodiment, the data unit after the receive operation of the first message through part of the protocol layers may include a data unit after the receive operation of the first message through common configuration of the protocol of the bearer. For example, under an existing protocol stack architecture, the data unit after the receive operation of the first message through part of the protocol layers may include at least one of: a transmission block TB after the receive operation of the first message through a physical layer; a MAC SDU or a RLC PDU after the receive operation of the first message through the MAC layer; a RLC SDU or a PDCP PDU after the receive operation of the first message through the RLC layer; a PDCP SDU after the receive operation of the first message through the PDCP layer; a RRC message after the receive operation of the first message through the RRC layer. It should be understood that, the above-described data units after the receive operation of the first message through part of the protocol layers under the existing protocol stack architecture are only exemplary and not limitative. With evolution of the protocol stack architecture, the concept of the present disclosure also considers a data unit after the receive operation of the first message through other protocol layers. In an embodiment, the data unit after the receive operation of the first message through part of the protocol layers may include a data unit after the receive operation of the first message through the common configuration of the above-described corresponding protocol of the bearer.

Since the second node does not have context information of the UE, the second node cannot perform receive operation for protocols at higher layers (e.g., the PDCP layer, RRC layer, etc.); the second node sends the RLC SDU or PDCP PDU after receive operation to the first node and sends the same in two modes, as follows:

Mode 1:

In step 802a, the second node includes the RLC SDU or PDCP PDU in an Xn message and sends it to the first node, the Xn message may be a retrieve UE context request message or other messages used for delivering the RLC SDU or PDCP PDU, and the Xn message may include at least one of:

a second indication, indicating whether the Xn message includes a first message or not. If the Xn message includes the first message, and if it is supported by the first node, it will be considered that the received Xn message includes the first message, and the RLC SDU or PDCP PDU in the Xn message is decoded according to the first configuration (for example, the security process of the AS stratum needs to be performed, such as decryption and/or integrity verification);

a first cause, indicating a cause for sending the Xn message. The first cause may be a resume cause, and the resume cause may be that the UE has information to transmit in the inactive state or idle mode, that is, the transmission of the first message;

The first node receives the RLC SDU or PDCP PDU. If there is no context information of the UE on the first node, the first node will not process the RLC SDU or PDCP PDU; and if there is context information of the UE on the first node, the first node can decode and/or decrypt the RLC SDU or PDCP PDU to the RRC layer, for further processing.

Mode 2:

In step 802b-1, the second node sends an RLC SDU or PDCP PDU transmission setup request to the first node to request the first node to establish a tunnel to transmit the RLC SDU or PDCP PDU of the UE, and the tunnel may be a tunnel on the Xn. The first node receives the RLC SDU or PDCP PDU transmission setup request.

In step 802b-2, if the first node has the UE context and supports and agrees to establish the tunnel used for transmitting the RLC SDU or PDCP PDU, the first node sends an RLC SDU or PDCP PDU setup response to the second node, to notify the second node that it can transmit the RLC SDU or PDCP PDU of the UE to the first node.

In step 802b-3, if the tunnel used for transmitting the RLC SDU or PDCP PDU is successfully setup, the second node sends the RLC SDU or PDCP PDU to the first node through the setup tunnel, which may include sending the RLC SDU or PDCP PDU (including the first message) on the Xn.

The first node receives the RLC SDU or PDCP PDU. Since there is the context information of the UE on the first node, the first node can decode and/or decrypt the RLC SDU or PDCP PDU to the RRC layer, for further processing.

In step 803, the first node transmits a NAS message that includes the first message to the core network node, which is consistent with that in step 507, and will not be repeated herein.

Thus, the information transmission method at least achieves the following beneficial effects: the UE in the inactive state or idle mode which moves to a new serving node can also perform security-protected information exchange with the network through the new serving node and the previous serving node, without entering the RRC connection procedure, and even in a separate network architecture, the security-protected information can also be received and operated quickly. Therefore, the power consumption of the UE is reduced and the battery life of the UE is prolonged, by avoiding the UE entering the RRC connection procedure, and at the same time, the delay and the signaling overheads of message transmission are reduced by avoiding the RRC connection procedure; in the information transmission method, one or more types of security protection mechanisms can also be supported, which improves the security and reliability of the information exchange. For example, if the information is positioning-related information, the method implements a positioning function of the UE in the idle mode or inactive state, so that the network and/or UE can apply a positioning result to other functions, such as paging, mobility management, network access, etc., in order to better support demands of various business use cases and industrial Internet use cases.

So far, descriptions of another information transmission method given by the present disclosure are completed. With the method, the UE in the inactive state or idle mode can move to a new serving node, and even if there is no UE-related connection context between the new serving node and the core network, the UE can also perform security-protected information exchange with the network through the new serving node and the previous serving node, so that a specific function (such as the positioning function in the inactive state or idle mode) of the UE in the inactive state or idle mode can be implemented. At the same time, the method can reduce the unnecessary signaling overheads and the connection resource consumption, and at the same time, can also reduce the power consumption of the UE and network device, thereby increasing the revenue of the operator.

Figure 9:
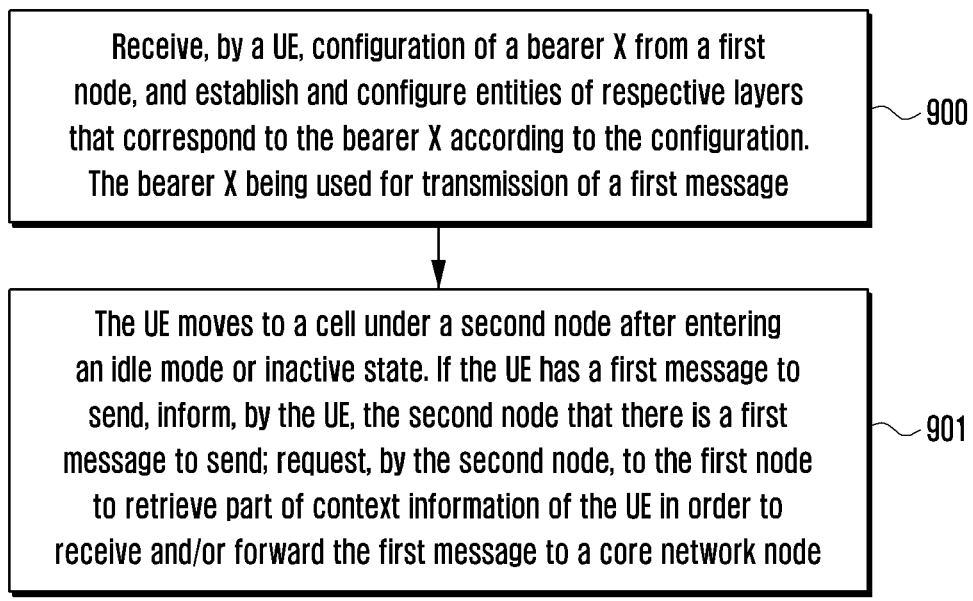
FIG. 9 shows a flow chart of yet another information transmission method according to an exemplary embodiment of the present disclosure.

Yet another information transmission method given by the present disclosure is as shown in FIG. 9. In order to avoid unnecessarily obscuring the concept of the present disclosure, detailed descriptions of steps irrelevant to the present disclosure are omitted herein. The method may include steps of:

Step 900: a UE receives configuration of a bearer X from a first node, and the UE establishes and configures entities of respective layers that correspond to the bearer X, according to the configuration, and the bearer X is used for the transmission of the first message. The first node is a last serving node of the UE, as described in steps 400 to 402.

Step 901: after entering the idle mode or inactive state, the UE moves to a cell under a second node, and the second node may be a base station, a CU or a CU-CP. If the UE has the first message to send, the UE can read system information of the cell under the second node, the system information can include information such as whether the second node supports the transmission of the first message and common configuration, etc., and the UE sends the first message to the second node according to the system information. Since the second node does not have the context information of the UE, the second node requests to the first node to retrieve the context information of the UE. In one embodiment, the context information of the UE may be part of the context information of the UE, and the part of the context information refers to context information that supports the transmission of the first message, such as information about which core network node the first message needs to be transmitted to, and protocol information for decoding the bearer X that includes the first message, such as the configuration information of the AS security mode and/or the configuration information of the RLC layer, etc. If the second mode retrieves the part of the context information of the UE from the first node, the second node can successfully decode the bearer X that includes the first message, and further transmits the first message to the corresponding core network node, according to the part of the context information of the UE.

Thus, the information transmission method at least achieves the following beneficial effects: the UE in the inactive state or idle mode which moves to a new serving node can also perform security-protected information exchange directly with the network through the new serving node, without entering the RRC connection procedure, and even in a separate network architecture, the security-protected information can also be received and operated quickly. Therefore, the power consumption of the UE is reduced and the battery life of the UE is prolonged, by avoiding the UE entering the RRC connection procedure, and at the same time, the delay and the signaling overheads of message transmission are reduced by avoiding the RRC connection procedure; in the information transmission method, one or more types of security protection mechanisms can also be supported, which improves the security and reliability of the information exchange. For example, if the information is positioning-related information, the method implements a positioning function of the UE in the idle mode or inactive state, so that the network and/or UE can apply a positioning result to other functions, such as paging, mobility management, network access, etc., in order to better support demands of various business use cases and industrial Internet use cases.

So far, descriptions of yet another information transmission method given by the present disclosure are completed. With the method, even when moving to a new serving node, the UE in the inactive state or idle mode can also perform security-protected information exchange directly with the network through the new serving node, so that a specific function (such as the positioning function in the inactive state or idle mode) of the UE in the inactive state or idle mode can be implemented. At the same time, the method can reduce the unnecessary signaling overheads and the connection resource consumption, and at the same time, can also reduce the power consumption of the UE and network device, thereby increasing the revenue of the operator.

Figure 10:
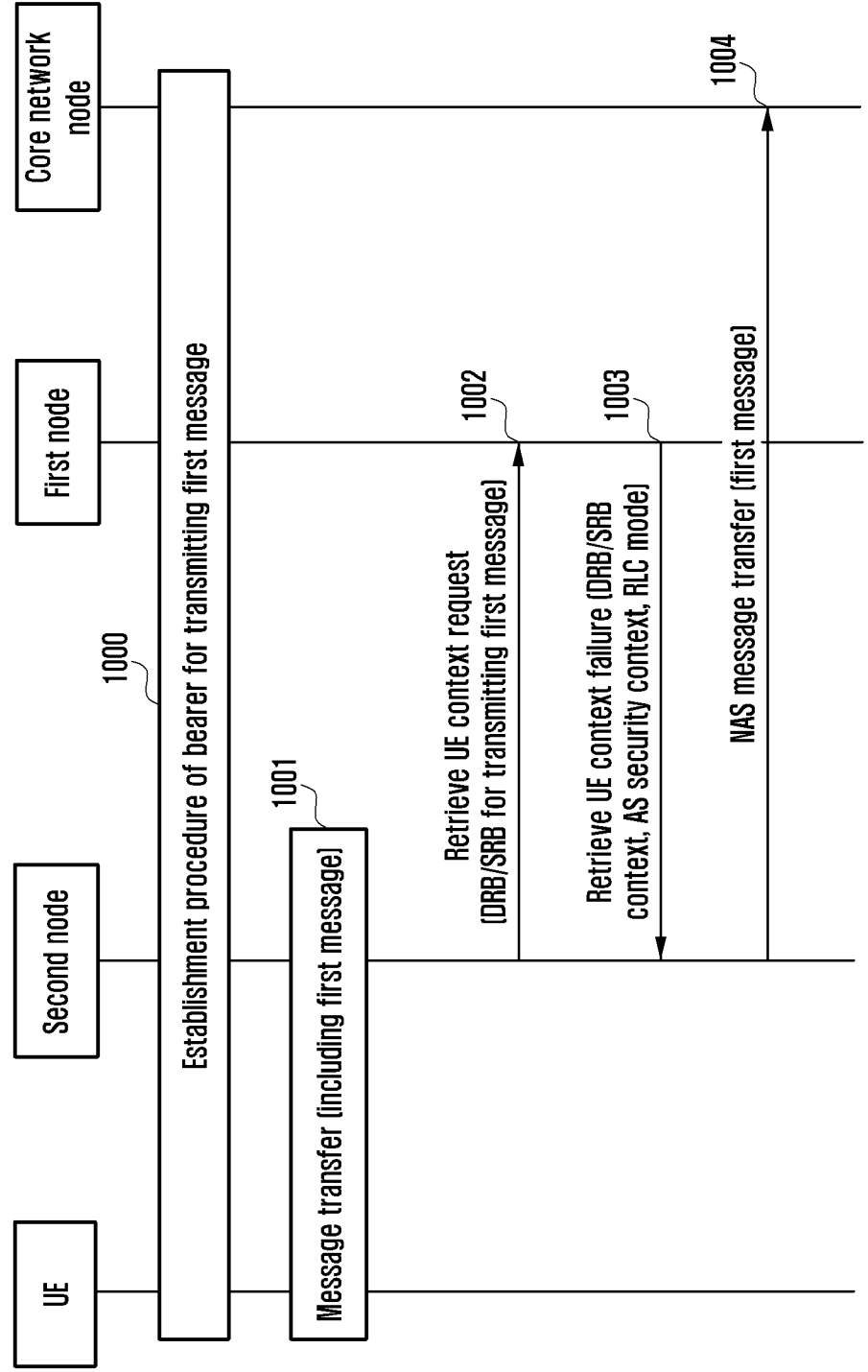
FIG. 10 shows an exemplary message flow diagram of the yet another information transmission method according to an exemplary embodiment of the present disclosure.

An embodiment I of the yet another information transmission method given by the present disclosure is as shown in FIG. 10. In order to avoid unnecessarily obscuring the concept of the present disclosure, detailed descriptions of steps irrelevant to the present disclosure are omitted herein. The embodiment I may include steps of:

Step 1000: an establishment procedure of a bearer used for transmitting the first message, in which participating nodes are a UE, a first node, and a core network node. The first node sends first configuration to the UE, and the first configuration refers to related configuration of a bearer that supports or used for transmitting the first message. The specific steps and contents are as described in steps 500 to 503 or steps 600 to 607. Wherein, the first node is a base station or a CU or a CU-CP, and the first node is a last serving node of the UE, and it stores the context information of the UE and/or core network node connections.

Step 1001: the UE transmits a message that includes the first message to a second node. The second node is a base station, a CU or a CU-CP. If the second node is the base station, a transmission mode of the first message can be as described in steps 504 to 505; if the second node is the CU or CU-CP, a transmission mode of the first message can be as described in steps 612 to 614. Different from the first node, the second node is not a last serving cell of the UE, that is, the second node does not have the context information of the UE, and due to the use of a CCCH channel and a RLC TM mode or a common RLC AM mode or a common RLC UM mode, the second node can parse by itself or obtain the RLC SDU or PDCP PDU that includes the first message through the DU under the second node.

Step 1002: the second node sends a retrieve UE context request message to the first node. The message may include a request to only retrieve part of UE context, that is, only the context information corresponding to the bearer used for transmitting the first message is retrieved.

Step 1003: the first node sends a retrieve UE context failure message to the second node. The message may include the part of the context information requested in step 1002, that is, context information corresponding to the bearer used for transmitting the first message. In addition, the message may further include AS security context information and an RLC mode and logical channel configuration that correspond to the bearer.

The second node receives the above messages, and configures or establishes a bearer context according to the messages, to receive a message that includes the first message.

Step 1004: after the second node successfully parses the message that includes the first message, if the message is to be transmitted to the core network node, the second node sends an NAS message that includes the first message to the core network node. The NAS message can be transmitted by an initial UE message or an uplink NAS transfer message. It should be understood that although the above-mentioned names of the messages used for transmitting the NAS messages are given for illustrative purposes, this is not meant to be limiting, but rather the NAS message can also be transmitted using other messages, without departing from the scope of the present disclosure.

Thus, the information transmission method at least achieves the following beneficial effects: the UE in the inactive state or idle mode which moves to a new serving node can directly perform security-protected information exchange with the network through the new serving node, without entering the RRC connection procedure, nor the new serving node establishing all the UE context. Therefore, the power consumption of the UE is reduced and the battery life of the UE is prolonged, by avoiding the UE entering the RRC connection procedure, and at the same time, the delay and the signaling overheads of message transmission are reduced by avoiding the RRC connection procedure; in the information transmission method, one or more types of security protection mechanisms can also be supported, which improves the security and reliability of the information exchange. For example, if the information is positioning-related information, the method implements a positioning function of the UE in the idle mode or inactive state, so that the network and/or UE can apply a positioning result to other functions, such as paging, mobility management, network access, etc., in order to better support the demands of various business use cases and industrial Internet use cases.

So far, descriptions of the embodiment I of the yet another information transmission method given by the present disclosure are completed. With the method, even when moving in position, the UE in the inactive state or idle mode can also directly perform security-protected information exchange with the network through the new serving node, without the new serving node establishing all the UE context, so that specific functions (such as the positioning function in the inactive state) of the UE in the inactive state can be implemented. At the same time, the method can reduce the unnecessary signaling overheads and the connection resource consumption, and at the same time, can also reduce the power consumption of the UE and network device, thereby increasing the revenue of the operator.

Figure 11:
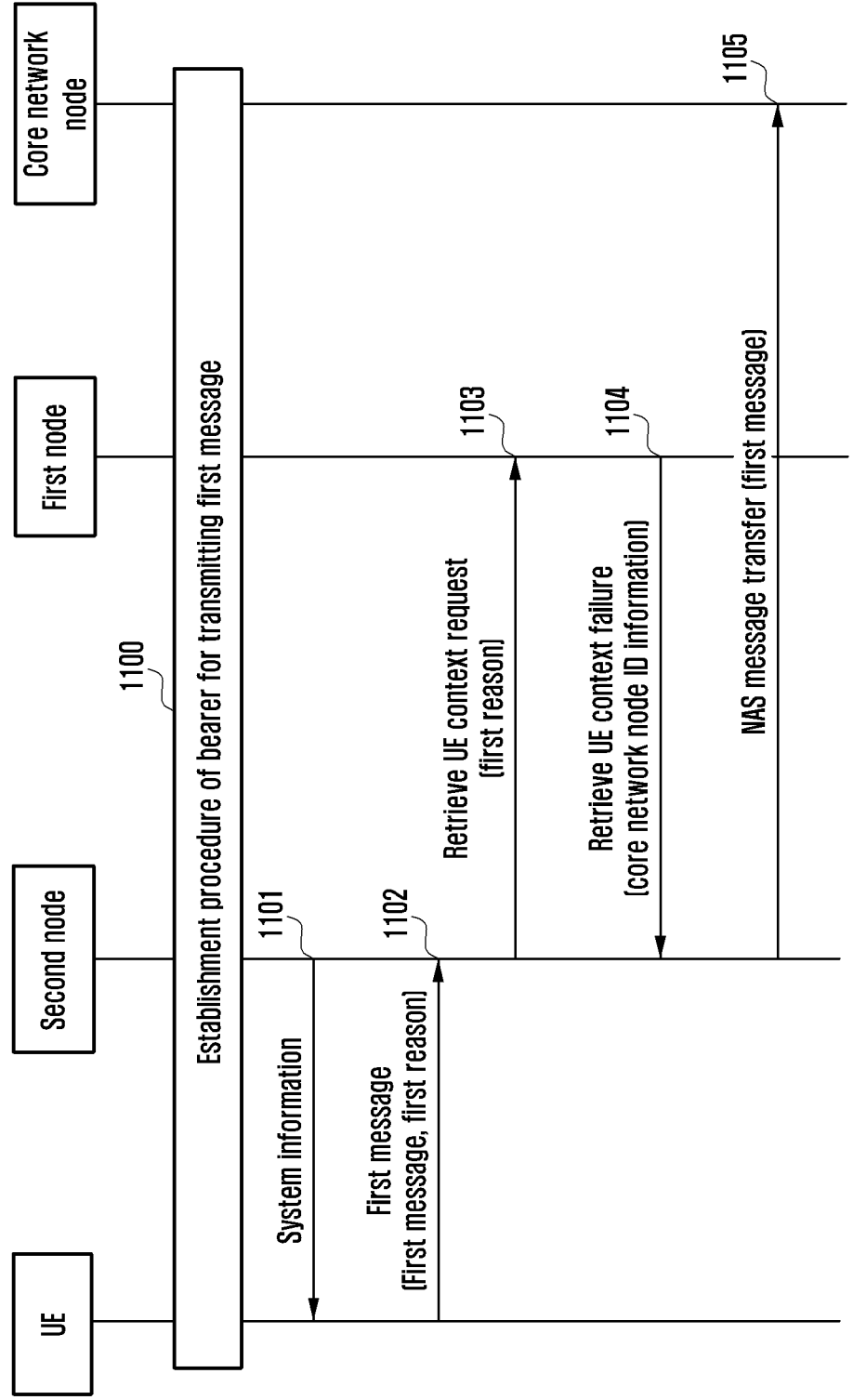
FIG. 11 shows another example message flow diagram of the yet another information transmission method according to an exemplary embodiment of the present disclosure.

An embodiment II of yet another information transmission method given by the present disclosure is as shown in FIG. 11. Detailed descriptions of steps irrelevant to the present disclosure are omitted herein. The embodiment II may include steps of:

Step 1100: An establishment procedure of a bearer used for transmitting the first message, in which participating nodes are a UE, a first node, and a core network node. In the establishment procedure, the first node sends first configuration to the UE, and the first configuration refers to related configuration of a bearer that supports or used for transmitting the first message. The specific steps and contents are as described in steps 500 to 503 or steps 600 to 607. Wherein, the first node is a base station or a CU or a CU-CP, the first node is a last serving node of the UE, and stores context information of the UE and/or core network node connections.

After step 1100, the UE enters the inactive state or idle mode.

Step 1101: the UE in an inactive state or an idle mode moves to a region covered by a second node, and the second node is a base station, a CU or a CU-CP. The second node sends system information, and the UE reads the system information. Contents of the system information are consistent with those described in step 504, that is, a first indication (to indicate whether a cell under the second node supports the transmission of the first message), random access resource configuration corresponding to a mode of transmitting the first message (a random access resource used when the first message is transmitted for the first time), and/or Transport Block Size (TBS) information (the TBS information is used for indicating the TBS size occupied by the first message in msg3 or msgA) may be included.

Step 1102: if the cell supports the transmission of the first message, and the UE has the first message to send in the inactive state, the UE sends the first message to the second node. The specific transmission mode of the first message is consistent with that described in step 505, which will not be repeated herein. The first message may further include at least one of:

A cell ID of a last serving cell, for the node that receives the first message to find the last serving cell of the UE;

A UE ID (such as a cell radio network temporary identity C-RNTI) of the UE in the last serving cell, for acquiring information of the corresponding UE when the UE context is retrieved;

A first cause, indicating a cause for sending the first message. The cause may be a resume cause, and the resume cause may be that the UE has information to transmit in the inactive state or idle mode, that is, transmission of the first message.

Step 1103: after the second node receives the first message, if the second node is not the cell that serves the UE last, the second node sends the retrieve UE context request message to the node (i.e., the first node) where the last serving cell is located, according to the cell ID of the last serving cell in step 1102. The message includes at least one of:

A UE ID of the UE in the last serving cell, for indicating context information of which UE needs to be retrieved;

A first cause, indicating a cause for sending the message. The cause may be a resume cause, and the resume cause may be that the UE has information to transmit in the inactive state or idle mode, that is, the transmission of the first message;

Step 1104: in response to receiving the retrieve UE context request message, the first node sends a retrieve UE context failure message to the second node in step 1104, according to information provided in the message. The retrieve UE context failure message includes information of:

Core network node ID information, for providing relevant information about the core network node to which the UE is connected. The information may be an ID of a core network node, such as an AMF ID, an LMF ID, etc., or may be a UE ID, and the UE ID includes information of the core network node that serves the UE, such as an S-TMSI. It should be understood that the information of the core network node that serves the UE included in the UE ID is not limited to this, but may include other information used for indicating the core network node that serves the UE, without departing from the scope of the present disclosure.

Step 1105: in response to receiving the retrieve UE context failure message, the second node sends a NAS message (including the first message) to the corresponding core network node, according to the information of the core network node ID provided in the retrieve UE context failure message. The specific contents are consistent with those in step 507, which will not be repeated herein.

Thus, the information transmission method at least achieves the following beneficial effects: the UE in the inactive state or idle mode which moves to a new serving node can directly perform security-protected information exchange with the network through the new serving node, without entering the RRC connection procedure, nor the new serving node establishing all the UE context. Therefore, the power consumption of the UE is reduced and the battery life of the UE is prolonged, by avoiding the UE entering the RRC connection process, and at the same time, the delay and the signaling overheads of message transmission are reduced by avoiding the RRC connection procedure; in the information transmission method, one or more types of security protection mechanisms can also be supported, which improves the security and reliability of the information exchange. For example, if the information is positioning-related information, the method implements a positioning function of the UE in the idle mode or inactive state, so that the network and/or UE can apply a positioning result to other functions, such as paging, mobility management, network access, etc., in order to better support the demands of various business use cases and industrial Internet use cases. So far, descriptions of an information transmission method given by the present disclosure are completed. With the method, even when moving in position, the UE in the inactive state can perform security-protected information exchange with the network, even if the new serving node fails to retrieve the UE context or the new serving node does not need to establish the UE context, so that specific functions (such as the positioning function in the inactive state) of the UE in the inactive state can be implemented. At the same time, the method can reduce unnecessary signaling overheads and connection resource consumption, and can also reduce the power consumption of the UE and network device, thereby increasing the revenue of the operator.

Figure 12:
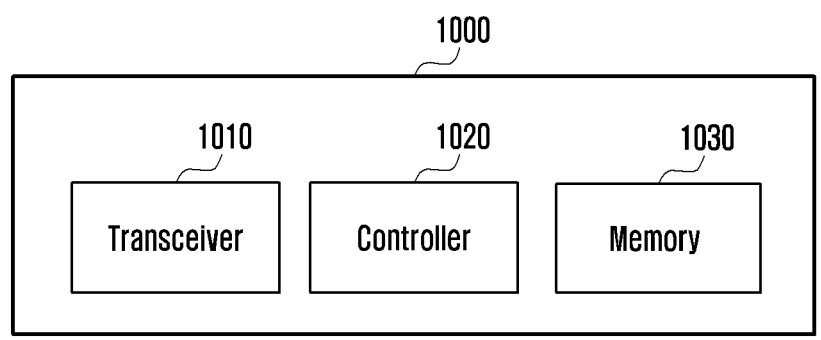
FIG. 12 is a block diagram of a node according to an exemplary embodiment of the present disclosure.

FIG. 12 is a block diagram of a node according to an example embodiment of the present disclosure. Here, its structure and function are illustrated with a node taken as an example, but it should be understood that the structure and function shown are similarly applicable to a base station (or a CU, or a CU-CP, or a CU-UP, or a DU, etc.).

Referring to FIG. 12, the node 1000 includes a transceiver 1010, a controller 1020, and a memory 1030. Under control of the controller 1020 (which may be implemented as one or more processors), the node 1000 (including the transceiver 1010 and the memory 1030) is configured to perform operations of nodes in the flows shown in FIGS. 4-11 or described above or below. Although the transceiver 1010, the controller 1020, and the memory 1030 are shown as separate entities, they may be implemented as a single entity, such as a single chip. The transceiver 1010, the controller 1020, and the memory 1030 may be electrically connected or coupled to each other. The transceiver 1010 may send signals to and receive signals from other network entities, such as another node and/or UE, etc. In one implementation, the transceiver 1010 may be omitted. In this case, the controller 1020 may be configured to execute instructions (including computer programs) stored in the memory 1030 to control the overall operation of the node 1000, thereby implementing the operations of the nodes in the flows shown in FIGS. 4-11 or described above or below.

Figure 13:
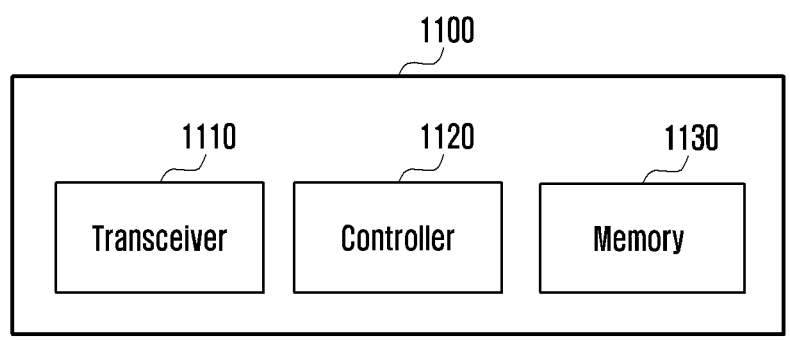
FIG. 13 is a block diagram of a user equipment according to an exemplary embodiment of the present disclosure.

FIG. 13 is a block diagram of user equipment according to an example embodiment of the present disclosure.

Referring to FIG. 13, the user equipment 1100 includes a transceiver 1110, a controller 1120, and a memory 1130. Under control of the controller 1120 (which can be implemented as one or more processors), the user equipment 1100 (including the transceiver 1110 and the memory 1130) is configured to execute operations of the user equipment in the flows shown in FIGS. 4-11 or described above or below. Although the transceiver 1110, the controller 1120, and the memory 1130 are shown as separate entities, they may be implemented as a single entity, such as a single chip. The transceiver 1110, the controller 1120, and the memory 1130 may be electrically connected or coupled to each other. The transceiver 1110 may send signals to and receive signals from other network entities, such as a node and another UE, etc. In one implementation, the transceiver 1110 may be omitted. In this case, the controller 1120 may be configured to execute instructions (including computer programs) stored in the memory 1130 to control the overall operation of the user equipment 1100, thereby executing the operations of user equipment in the flows shown in FIGS. 4-11 or described above or below.

Figure 14:
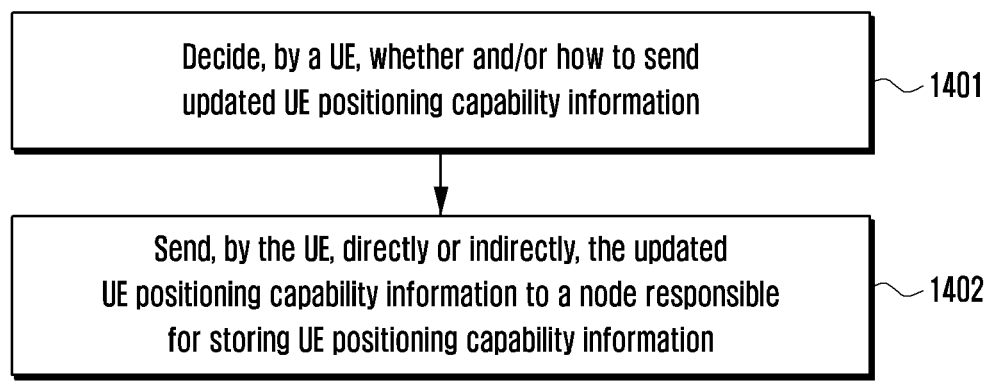
FIG. 14 shows an exemplary flow chart of yet another information transmission method according to an exemplary embodiment of the present disclosure.

Yet another information transmission method given by the present disclosure is as shown in FIG. 14. In order to avoid unnecessarily obscuring the concept of the present disclosure, detailed descriptions of steps irrelevant to the present disclosure are omitted herein. The method may include steps of:

Step 1401: when positioning capability of a UE changes, the UE decides whether and/or how to send updated UE positioning capability information to a first node. The first node is a node that is responsible for collecting or storing UE positioning capability information, and may be a core network node or a base station, and the core network node may be, for example, an AMF or an LMF.

The UE decides whether to send the updated UE positioning capability information to the first node, and the UE decide whether to initiate an update according to one of several cases of:

Case 1: according to its own configuration, whenever a UE has already sent UE positioning capability information to a first node, if the positioning capability changes, the UE will send the updated UE positioning capability information to the first node, to update the positioning capability of the UE.

Case 2: when requesting UE positioning capability for the first time, a first node sends information related to storing of the UE positioning capability information to the UE. The UE sends the UE positioning capability information to the first node according to the information, and knows that the first node will store the UE positioning capability information, and if the positioning capability changes, the UE will send the updated UE positioning capability information to the first node, to update the positioning capability of the UE.

Case 3: after a UE sends UE positioning capability information to a first node, the first node sends information related to the storing of the UE positioning capability information to the UE. According to the information, the UE knows that the first node has the storage of the UE positioning capability information, and if the positioning capability changes, the UE will send the updated UE positioning capability information to the first node, to update the positioning capability of the UE.

Next, the UE decides how to send the updated UE positioning capability information to the first node, and if the UE has already sent detailed parameters (for example, locationCoordinateTypes, VelocityTypes, etc. of an Assisted-GNSS (A-GNSS) positioning method) of the positioning method to the first node, the UE sends state-related information (for example, if the UE enables the positioning method, then the state-related information is that the positioning method is supported, and if the UE disables the positioning method, then the state-related information is that the positioning method is not supported) about whether the positioning method is supported by the UE to the first node, for example, the UE sends the state-related information to the first node, including whether the A-GNSS positioning method is supported or not, and the Wireless Local Area Network (WLAN) positioning method is supported or not, and/or the Bluetooth positioning method is supported or not, but not including the detailed parameters of the positioning method, because the detailed parameters of the positioning method have been stored by the first node, thereby reducing the signaling overheads of an interface.

Step 1402: if the UE decides to send the updated UE positioning capability information to the first node, the UE directly or indirectly sends the updated UE positioning capability information to the first node. Possible scenarios include at least one of:

Scenario 1: the first node is an AMF, the UE directly sends the updated UE positioning capability information to the AMF, the information is delivered by the NAS message, or the UE sends the updated UE positioning capability information to the AMF through an LMF, and the information is delivered by an LPP message;

Scenario 2: the first node is an LMF, and the UE directly sends the updated UE positioning capability information to the LMF, and the information is delivered by an LPP message, or the UE sends the updated UE positioning capability information to the LMF through an AMF, and the information is delivered by a NAS message; and Scenario 3: the first node is a base station, and the UE directly sends the updated UE positioning capability information to the base station, and the information is delivered by an RRC message or an LPP message.

The updated UE positioning capability information may include state-related information used for indicating whether a stored positioning method is supported, the state-related information may be whether the positioning method is supported by the UE (for example, the A-GNSS positioning method is supported or not supported, the WLAN positioning method is supported or not supported, and/or the Bluetooth positioning method is supported or not supported), and the state-related information is determined by a behavior of the UE. The above contents are only examples, but not a limitation.

The first node receives the state-related information used for indicating whether the stored positioning method is supported, and updates the stored UE positioning capability information; the state-related information is only used for indicating whether a corresponding positioning method is supported after this moment; a node (may or may not be the first node) that is responsible for managing UE positioning selects an appropriate positioning method when positioning is initiated, and the method is supported by the UE; the state-related information will not affect the detailed parameters of the positioning method, and the detailed parameters of the positioning method will be stored by the first node until the UE leaves the service range of the first node. For example, if the A-GNSS positioning method is not supported in the updated UE positioning capability information, the first node stores the detailed parameters of the A-GNSS positioning method that is previously stored, but only sets the A-GNSS positioning method to be not supported, and thus, when positioning is initiated, a node that is responsible for positioning method selection and/or management will not select the A-GNSS positioning method; if the A-GNSS positioning method is supported in the updated UE positioning capability information, the first node continues to use the detailed parameters of the A-GNSS positioning method that is previously stored, and sets the A-GNSS positioning method to be supported, and thus, when positioning is initiated, a node that is responsible for positioning method selection and/or management can select the A-GNSS positioning method.

In this specification, for the UE side, the positioning method being supported or not supported mentioned in all steps has a same meaning as enabling or disabling of the positioning method, which means that the UE can enable or disable a positioning method by itself for power saving or other purposes, on the premise that the UE supports the positioning method; for the network, it means whether the positioning method is supported by the UE at the current moment.

Thus, the information transmission method at least achieves the following beneficial effects: when positioning capability information (including the detailed parameters of the positioning method) of a UE is stored in a node that is responsible for positioning management in order to reduce the positioning delay, if the positioning capability of the UE changes due to its behavior, it can be guaranteed with the method that the node that is responsible for positioning management can always obtain the latest UE positioning capability information, so that the node that is responsible for positioning management can make accurate positioning measurement, which avoids positioning failure or a decrease in positioning accuracy due to inaccurate positioning capability. Moreover, the method guarantees by using the minimum signaling load that the node that is responsible for positioning management obtains the latest positioning capability information, which not only shortens delay of positioning, but also guarantees accuracy of positioning and reduces the signaling load.

Figure 15:
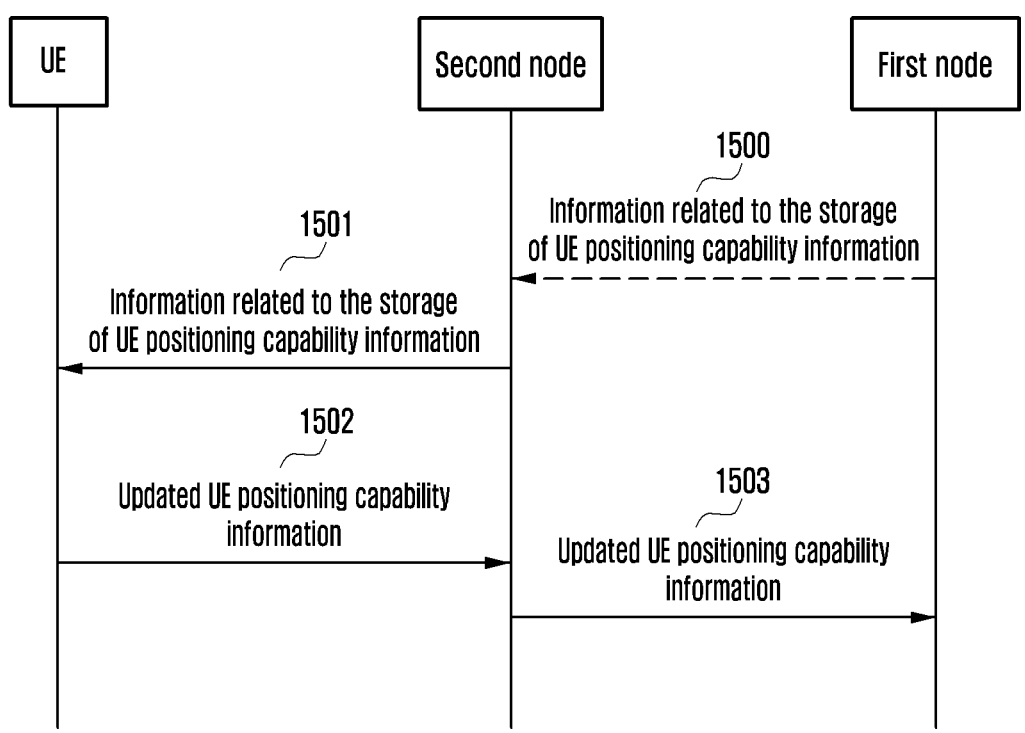
FIG. 15 shows another exemplary message flow diagram of the yet another information transmission method according to an exemplary embodiment of the present disclosure.

A message flow diagram of the yet another information transmission method given by the present disclosure is as shown in FIG. 15. In order to avoid unnecessarily obscuring the concept of the present disclosure, detailed descriptions of steps irrelevant to the present disclosure are omitted herein. The method may include steps of:

Step 1500: if a node that is responsible for storing (and/or managing) the UE positioning capability information and a node that is responsible for acquiring (and/or managing) the UE positioning capability information are not a same node, step 1500 is executed, and a first node sends information related to storage of the UE positioning capability information to a second node.

Wherein the first node is a node that is responsible for storing (and/or managing) the UE positioning capability information, and the second node is a node that is responsible for acquiring (and/or managing) the UE positioning capability information. In an implementation, the node that is responsible for storing (and/or managing) the UE positioning capability information and the node that is responsible for acquiring (and/or managing) the UE positioning capability information may be the same node. In an implementation, the first node and the second node may be the an AMF or an LMF, that is, it is possible that the AMF is the node that is responsible for storing (and/or managing) the UE positioning capability information, and the LMF is the node that is responsible for acquiring (and/or managing) the UE positioning capability information, or the LMF is the node that is responsible for storing (and/or managing) the UE positioning capability information, and the AMF is the node that is responsible for acquiring (and/or managing) the UE positioning capability information. The information related to the storage of the UE positioning capability information may include at least one of:

Information used for indicating whether the UE positioning capability information will be stored by the network. When the information indicates that the UE positioning capability information will be stored by the network, and when the UE positioning capability information changes, the updated UE positioning capability information needs to be generated and an update flow needs to be initiated, that is, the UE sends the updated UE positioning capability information to the first node or second node;

Information used for indicating stored positioning methods, the positioning method may be, for example, an A-GNSS positioning method, a WLAN positioning method, and/or a Bluetooth positioning method, etc. The detailed parameters of the positioning method are constant, but the positioning method can be enabled or disabled by the UE, that is, the detailed parameters of the positioning method can be stored on the node that is responsible for storing (and/or managing) the UE positioning capability information, but the positioning method may be enabled or disabled at any time due to the behavior of the UE; when the positioning method is enabled or disabled due to the behavior of the UE, the UE can generate the updated UE positioning capability information according to the information used for indicating stored positioning methods, for example, whether a positioning method is enabled or disabled can be simply indicated by a bit; each bit represents a positioning method, and a value on the bit can represent whether the corresponding positioning method is enabled or disabled, for example, a value 0 can represent being disabled, and a value 1 can represent being enabled. The above way for representing enabling or disabling of the positioning method is only an example, but is not a limitation. Enabling or disabling of the positioning method can be represented in other ways, without departing from the scope of the present disclosure.

The second node receives the information.

Step 1501: the second node sends information related to the storage of the UE positioning capability information to the UE, and the information may include at least one of:

Information used for indicating whether the UE positioning capability information will be stored by the network. When the information indicates that the UE positioning capability information will be stored by the network, and when the UE positioning capability information changes, the updated UE positioning capability information needs to be generated and an update flow needs to be initiated, that is, the UE sends the updated UE positioning capability information to the first node or second node;

Information used for indicating stored positioning methods, the positioning method may be, for example, an A-GNSS positioning method, a WLAN positioning method, and/or a Bluetooth positioning method, etc. The detailed parameters of the positioning method are constant, but the positioning method can be enabled or disabled by the UE, that is, the detailed parameters of the positioning method can be stored on the node that is responsible for storing (and/or managing) the UE positioning capability information, but the positioning method may be enabled or disabled at any time due to the behavior of the UE; when the positioning method is enabled or disabled due to the behavior of the UE, the UE can generate the updated UE positioning capability information according to the information used for indicating stored positioning methods, for example, a bit can be used simply for indicating whether the positioning method is enabled or disabled; each bit represents a positioning method, and a value on the bit can represent whether the corresponding positioning method is enabled or disabled, for example, a value 0 can represent being disabled, and a value 1 can represent being enabled. The above way for representing enabling or disabling of the positioning method is only an example, but is not a limitation. Enabling or disabling of the positioning method may be represented in other ways, without departing from the scope of the present disclosure.

The information related to the storage of the UE positioning capability information may be sent by the LPP message or NAS message or RRC message. If the information is sent by the LPP message, the LPP message may be an LPP capability request message or an LPP capability provision message; if the information is sent by a NAS message or an RRC message, the NAS message or RRC message may be a UE capability enquiry message or UE capability information message. The above mentioned names of the messages are only examples, but not a limitation. Other message names can also be used, without departing from the scope of this disclosure.

The UE receives and stores the information.

Step 1502: when the UE positioning capability information changes, the UE generates the updated UE positioning capability information, considering the information related to the storage of the UE positioning capability information or according to its own configuration (such as the two cases mentioned in step 1401), and sends the updated UE positioning capability information to the second node. The updated UE positioning capability information may include information related to the update of the stored UE positioning capability information and/or un-stored UE positioning capability information. The stored UE positioning capability information may be the state-related information used for indicating whether the positioning method is supported, for example, the A-GNSS positioning method is supported or not supported, the WLAN positioning method is supported or not supported, and/or the WI-FI positioning method is supported or not supported, etc. The information related to the update of the stored UE positioning capability information is used for updating the stored UE positioning capability information. The un-stored UE positioning capability information refers to the UE positioning capability information that is not included in the stored UE positioning capability information, and if it is positioning method-related information, the detailed parameters of the positioning method further need to be included.

The second node receives the updated UE positioning capability information.

Step 1503: if a node that is responsible for storing (and/or managing) the UE positioning capability information and a node that is responsible for acquiring (and/or managing) the UE positioning capability information are not the same node, step 1503 is executed, wherein the first node is the node that is responsible for storing (and/or managing) the UE positioning capability information, and the second node is the node that is responsible for acquiring (and/or managing) the UE positioning capability information. The second node sends the updated UE positioning capability information received in step 1502 to the first node.

The first node receives the updated UE positioning capability information.

The node that is responsible for storing (and/or managing) the UE positioning capability information may be the first node or the second node. In a case where the node that is responsible for storing (and/or managing) the UE positioning capability information is the first node, after receiving the updated UE positioning capability information, the first node obtains the state-related information included in the updated UE positioning capability information and used for indicating whether the stored positioning method is supported, and updates the stored UE positioning capability information according to the state-related information. The state-related information is only used for indicating whether the corresponding positioning method is supported after this moment, and the node that is responsible for managing UE positioning selects an appropriate positioning method when positioning is initiated, and the positioning method is supported by the UE; the state-related information will not affect the detailed parameters of the positioning method, and the detailed parameters of the positioning method will be stored by the first node, until the UE leaves the service coverage of the first node. For example, if the A-GNSS positioning method is not supported in the updated UE positioning capability information, the first node stores the detailed parameters of the A-GNSS positioning method that is previously stored, but only sets the A-GNSS positioning method to be not supported, and thus, when positioning is initiated, the node that is responsible for positioning method selection and/or management will not select the A-GNSS positioning method; if the A-GNSS positioning method is supported in the updated UE positioning capability information, the first node continues to use the detailed parameters of the A-GNSS positioning method that is previously stored, and sets the A-GNSS positioning method to be supported, so that when positioning is initiated, the node that is responsible for positioning method selection and/or management can select the A-GNSS positioning method. The above contents are only examples, but not a limitation.

In the present disclosure, for the UE side, enabling or disabling of the positioning method mentioned in all steps has a same meaning as the positioning method being supported or not supported, which refers to that the UE can enable or disable the positioning method by itself for power saving or other purposes, on the premise that the UE supports the positioning method; for the network, it is whether the positioning method is supported by the UE at the current moment.

Thus, the information transmission method at least achieves the following beneficial effects: when the positioning capability information (including the detailed parameters of the positioning method) of the UE is stored in the node that is responsible for positioning management in order to reduce the positioning delay, if the positioning capability of the UE changes due to its behavior, it can be guaranteed with the method that the node that is responsible for positioning management can always obtain the latest UE positioning capability information, so that the node that is responsible for positioning management can make accurate positioning measurement, which avoids positioning failure or a decrease in positioning accuracy due to inaccurate positioning capability. Moreover, the method guarantees with the minimum signaling load that the node that is responsible for positioning management obtains the latest positioning capability information, which not only saves the delay of positioning, but also guarantees the accuracy of positioning and reduces the signaling load.

Figure 16:
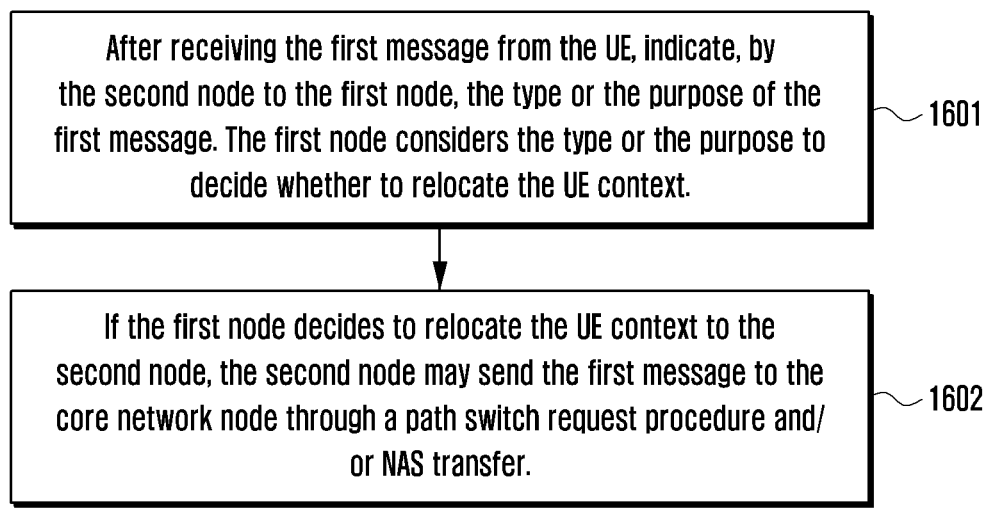
FIG. 16 shows an exemplary flow chart of yet another information transmission method according to an exemplary embodiment of the present disclosure.

An exemplary flow chart of yet another information transmission method given by the present disclosure is as shown in FIG. 16. In order to avoid unnecessarily obscuring the concept of the present disclosure, detailed descriptions of steps irrelevant to the present disclosure are omitted here. The method may include steps of:

Step 1601: indicating, by a second node to a first node, after receiving a first message from a UE, a type or a purpose of the first message. The first node and the second node may be base stations. In one embodiment, the first node is a base station storing UE context; and the second node is a base station currently serving the UE. In an embodiment, the first node may be a last serving node. Generally speaking, the last serving node has the UE context. The first message may be an AS message, or a NAS message, or an LPP message encapsulated by a NAS, or a Location Service (LCS) message, or a message transmitted on the UP, or other type of message.

If the second node knows the type or the purpose of the first message, for example, the second node may know the type or the purpose of the first message by indication by the UE, or the way of random access, or other ways, then the second node may indicate the type or the purpose of the first message to the first node. The type of the first message may indicate that the first message is a certain specific type of message, for example, an AS message, a NAS message, an LPP message, an LCS message, or a message transmitted on the UP. The type of the first message may also indicate that the first message is related to a specific function, for example, related to positioning. The purpose of the first message may be for signalling transmission, or traffic transmission, or for positioning, or for requesting allocation of a new radio resource, and so on. It should be understood that, the above is only an example, and the type and the purpose of the first message are not limited thereto. The first node may receive the type or the purpose of the first message, and consider the type or the purpose of the first message, to decide whether to perform UE context relocation, that is, to relocate the UE context to other node (e.g., the second node). According to an embodiment, if the type or the purpose of the first message is related to allocation/re-allocation of a radio resource, for example, the first message is related to uplink positioning, which requires the second (serving) node to allocate/re-allocate a radio resource for the UE, then the first node may consider relocating the UE context to the second node, so that the UE directly receives the allocated radio resource from the second node without via the first node, thereby avoiding complexity of signalling; according to another embodiment, if the type or the purpose of the first message is unrelated to re-allocation of a radio resource, for example, the first message only needs to be transmitted to a core network node through the second node or the first node, the first node may consider not to relocate the UE context, so that unnecessary information exchange may also be reduced by avoiding UE context relocation. It should be understood that, the above is only an example, and the situations in which the first node decides whether to perform UE context relocation by considering the type or the purpose of the first message are not limited thereto.

Step 1602: if the first node decides to relocate the UE context to the second node, the second node may send the first message to the core network node through a path switch procedure, or the second node may send the first message to the core network node after the path switch procedure. If the core network node wants to send a response message for the first message after receiving the first message, the response message may also be sent to the second node through the path switch procedure. If the first message and/or the response message for the first message are transmitted through the path switch procedure, message interaction delay is greatly reduced as compared to the transmission of the first message and/or the response message for the first message separately from the path switch procedure, which also greatly reduces positioning delay if the first message is related to a positioning process.

In this way, the information transmission method achieves at least beneficial effects below: if the UE in the inactive state or idle mode moves to a new serving node, the node storing the UE context is able to decide whether to relocate the UE context according to the type or the purpose of the message without the UE entering the RRC connection procedure, so as to better perform a subsequent procedure. Meanwhile, if the UE context is relocated, signalling interaction delay may also be reduced. By avoiding making the UE enter the RRC connection procedure, power consumption of the UE is reduced and battery life of the UE is prolonged; meanwhile, delay and signalling overhead of message transmission are reduced by avoiding the RRC connection procedure; in the information transmission method, one or more types of security protection mechanisms may further be supported, which improves security and reliability of information exchange. For example, if the information is positioning-related information, the method implements a positioning function of the UE in an Idle mode or inactive state, so that the network and/or the UE may apply a positioning result to other functions, such as paging, mobility management, network access, etc., in order to better support demands of various business use cases and industrial Internet use cases. So far, the description of an information transmission method given by the present disclosure is completed. By this method, the node storing the UE context is able to make the most appropriate decision for UE context relocation and may exchange security-protected information with the network, even when the UE in the inactive state or idle mode moves in position, so that specific functions of the UE in the inactive state or idle mode (e.g., the positioning function in the inactive state or idle mode) may be implemented. Meanwhile, this method can reduce unnecessary signalling overhead and connection resource consumption, and can also reduce power consumption of the UE and the network device, thereby increasing revenue of operators.

Figure 17:
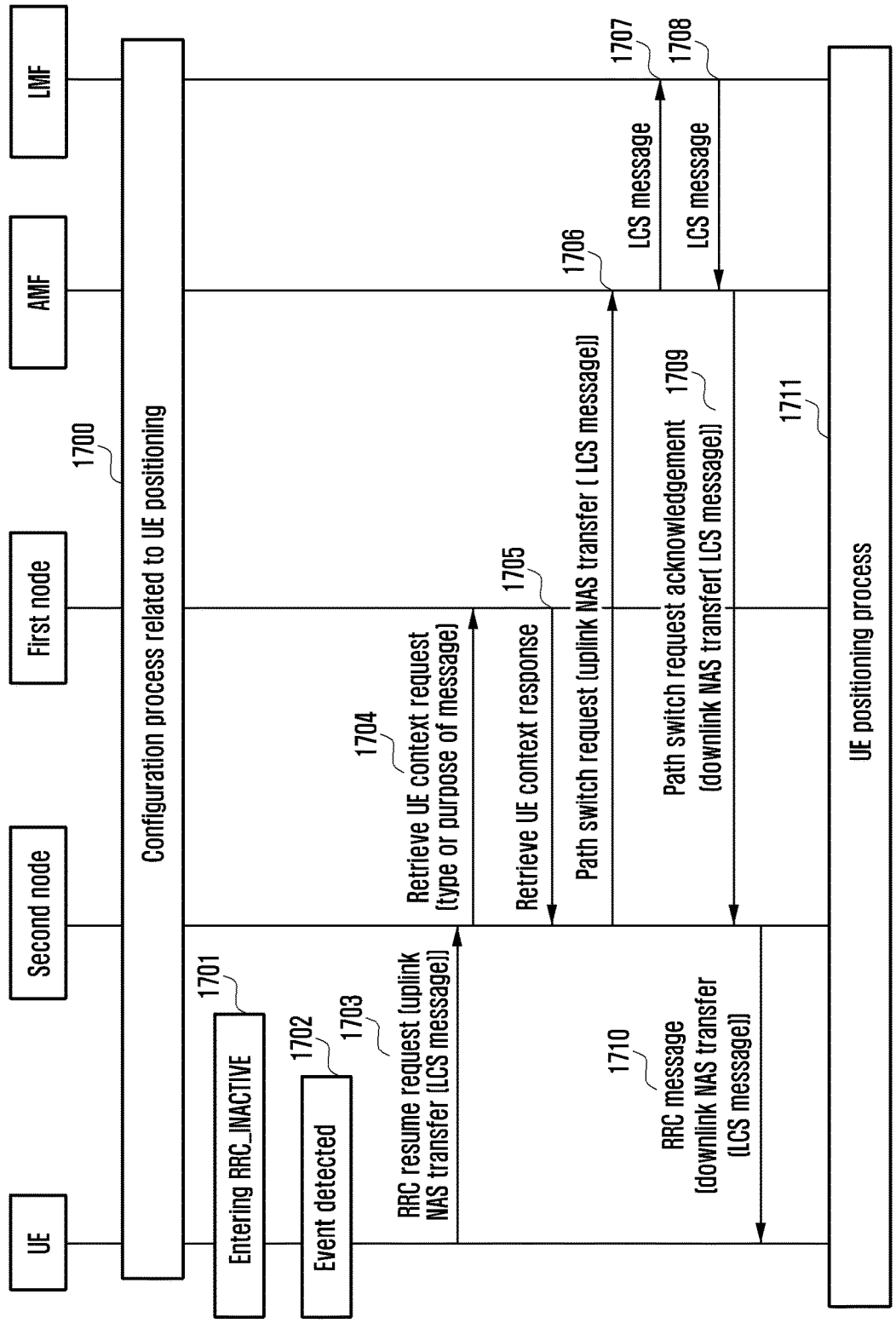
FIG. 17 shows another exemplary message flow diagram of the yet another information transmission method according to an exemplary embodiment of the present disclosure.

An exemplary message flow diagram of the yet another information transmission method given by the present disclosure is as shown in FIG. 17. Detailed descriptions of steps unrelated to the present disclosure are omitted herein. The exemplary message flow diagram may include steps of:

Step 1700, initiating, by an LMF, a configuration process related to UE positioning. For example, the configuration process may be initiated periodically or in response to a deferred Mobile Terminated Location Request (deferred MT-LR) of a location trigger event.

Step 1701: a UE entering an RRC_INACTIVE state or an idle mode.

Step 1702: detecting, by the UE, the location trigger event and/or arrival of periodically specified time.

Step 1703: sending, by the UE, an RRC message to the second node. In an embodiment, the RRC message may be an RRC resume request message, but it is not limited thereto. In another embodiment, the RRC message may be an RRC setup request message, but it is not limited thereto. The second node may be a base station. More specifically, the second node may be a node currently serving the UE. The RRC resume request message and/or the RRC setup request message may be an encapsulated RRC message, and for example, may carry an uplink NAS transfer message; the uplink NAS transfer message may include an LCS message; and the LCS message is one kind of the first messages as mentioned in the present disclosure. The RRC resume request message may optionally include the type or the purpose of the first message. For example, the type of the first message may be an LCS message; and the purpose of the first message may be for positioning. As discussed above, the type and the purpose of the first message are not limited thereto.

Step 1704: if the second node receiving the RRC resume request message and/or the RRC setup request message (and the message encapsulated therein) knows the type or the purpose of the first message, for example, the second node may know the type or the purpose of the first message through an indication by the UE, or a way of random access, or other ways. If the second node sends a message for acquiring the UE context to the first node, the message may include the type or the purpose of the first message. In an embodiment, the message for acquiring the UE context may be a retrieve UE context request message, but is not limited thereto. The first node is a base station. In an embodiment, the first node is a node having the UE context. For example, the first node may be the last serving node. The type or the purpose of the first message may be at least one of:

Message type, for indicating to the first node, the type of the first message sent by the UE, for example, LCS message, LPP message, positioning message, NAS message, AS message or others.

Message purpose, for indicating to the first node, the purpose for the UE sending the first message, for example, the purpose may be for positioning, for signalling transmission, for traffic transmission, for requesting and/or updating radio resource configuration, or others.

The first node considers the type or the purpose of the first message and decides whether to relocate the UE context. In an embodiment, if the type or the purpose of the first message is related to positioning or allocating/re-allocating a radio resource, the first node may decide to relocate the UE context; in this case, in step 1705, the first node sends to the second node a message for providing the UE context. In an embodiment, the message may be a retrieve UE context response message, but it is not limited thereto.

Step 1706: sending, by the second node to the AMF, a message related to path switch. In an embodiment, the message may be a path switch request message, but is not limited thereto. Optionally, the path switch request message may include the uplink NAS transfer message received in step 1703, and the uplink NAS transfer message may include an LCS message.

Step 1707: receiving, by the AMF, the path switch request message, and if the LCS message is included therein, forwarding, by the AMF, the LCS message to the LMF. For example, the LCS message may include an event report message.

Step 1708: receiving, by the LMF, the LCS message, and deciding whether to send a response message according to a situation. If there is a response message to be sent, the LMF sends the response message to the AMF. For example, the response message may be an LCS message, and the LCS message includes, for example, an event report ac-knowledge message.

Step 1709: receiving, by the AMF, the LCS message from the LMF, and encapsulating the same into the downlink NAS transfer message. The AMF sends a message related to path switch to the second node. In an embodiment, the message may be a path switch request acknowledgement message, but it is not limited thereto. The message may optionally include the downlink NAS transfer message.

Step 1710: receiving, by the second node, the path switch request acknowledgement message. If the downlink NAS transfer message is included therein, the second node sends the downlink NAS transfer message (including the LCS message) to the UE through the RRC message. In an embodiment, the RRC message may be an RRC resume message, but it is not limited thereto. In another embodiment, the RRC message may be an RRC setup message, but it is not limited thereto. In another embodiment, the RRC message may be an RRC release message, but it is not limited thereto.

Step 1711: if the LMF decides to initiate a subsequent positioning process, the LMF may directly perform an NR positioning protocol A (NRPPa) process with the second node, to implement a subsequent positioning process, for example, allocating an uplink positioning resource, etc.

In this way, it is ensured that the node having the UE context may reasonably decide whether to perform UE context relocation, for the UE in the RRC_INACTIVE or idle mode that needs to update the radio resource configuration (e.g., positioning configuration). If the UE context is relocated, direct signalling interaction with the core network may be completed faster through the above-described process, which reduces delay of signalling interaction, and meanwhile, reduces unnecessary information interaction and signalling complexity.

In this way, the information transmission method achieves at least the following beneficial effects: when the UE in the inactive state or idle mode moves to a new serving node, the node storing the UE context is able to decide whether to relocate the UE context according to the type or the purpose of the message without the UE entering the RRC connection procedure, so as to better perform a subsequent procedure. Meanwhile, if the UE context is relocated, signalling interaction delay may also be reduced. By avoiding making the UE enter the RRC connection procedure, power consumption of the UE is reduced and battery life of the UE is prolonged; meanwhile, delay and signalling overhead of message transmission are reduced by avoiding the RRC connection procedure; in the information transmission method, one or more types of security protection mechanisms may further be supported, which improves security and reliability of information exchange. For example, if the information is positioning-related information, the method implements a positioning function of the UE in an Idle mode or inactive state, so that the network and/or the UE may apply a positioning result to other functions, such as paging, mobility management, network access, etc., in order to better support demands of various business use cases and industrial Internet use cases. So far, the description of an information transmission method given by the present disclosure is completed. By this method, the node storing the UE context is able to make the most appropriate decision for UE context relocation, and may exchange security-protected information with the network, even when the UE in the inactive state or idle mode moves in position, so that the specific functions of the UE in the inactive state or idle mode (e.g., the positioning function in the inactive state or idle mode) may be implemented. Meanwhile, this method can reduce unnecessary signalling overhead and connection resource consumption, and can also reduce power consumption of the UE and the network device, thereby increasing revenue of operators.

Figure 18:
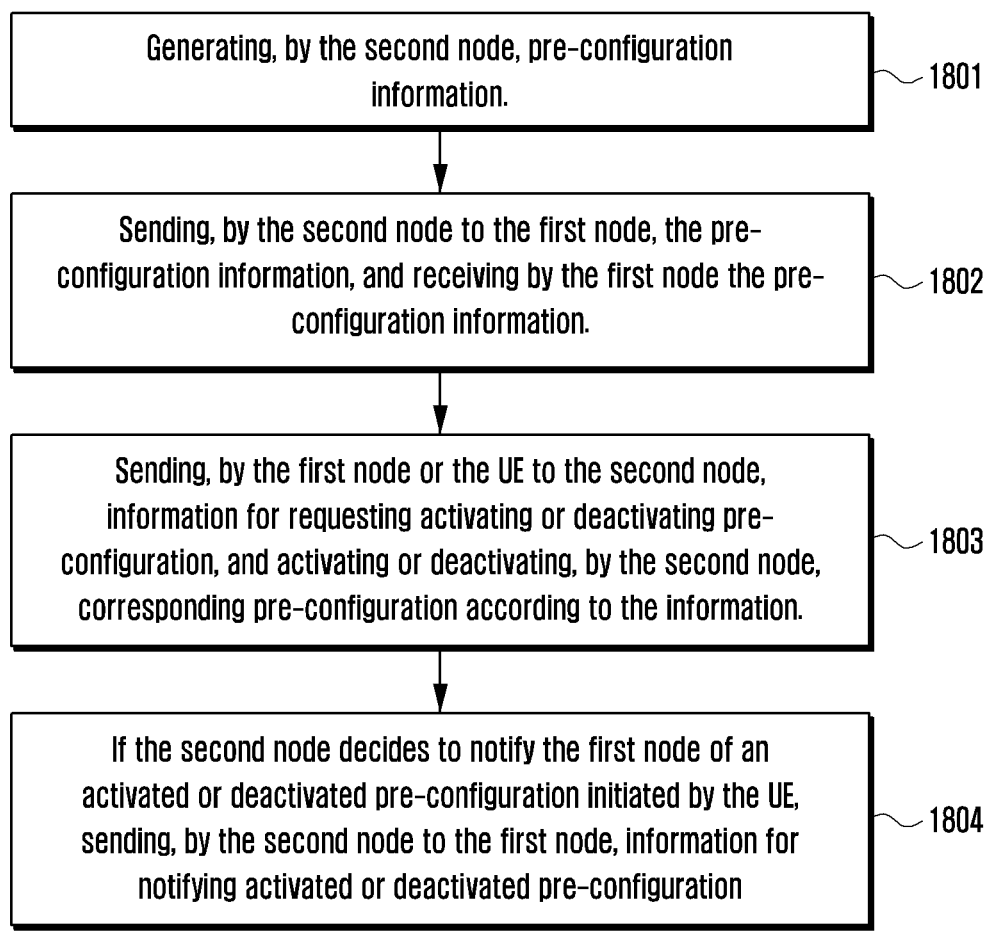
FIG. 18 shows an exemplary flow chart of yet another information transmission method according to an exemplary embodiment of the present disclosure.

An exemplary flow chart of another information transmission method provided by the present disclosure is shown in FIG. 18. To avoid unnecessarily obscuring the concept of the present disclosure, detailed description of steps unrelated to the present disclosure is omitted here. The method may include steps of:

Step 1801: generating, by the second node, pre-configuration information, wherein, the second node may be a DU or a base station. The second node may generate the pre-configuration information or configure the pre-configuration information for the UE according to UE capability information and/or information for generating the pre-configuration information. Wherein, the information for generating the pre-configuration information may be sent by a first node to the second node, and the first node may be a CU or an LMF, that is, the possible situations are, the CU sends, to the DU, the information for generating the pre-configuration information, or the LMF sends, to the base station, the information for generating the pre-configuration information; and the information for generating the pre-configuration information may be positioning related information, for example, may be an information list of Transmission Receiving Point (TRP) Positioning Reference Signal (PRS). The above is just an example, and the first node, the second node or the information for generating the pre-configuration information are not limited thereto. The second node configures or generates the pre-configuration information according to the information for generating the pre-configuration information and/or the UE capability information and so on; and the pre-configuration information may be positioning related information, for example, may include information for adding, modifying, or deleting a Pre-configured Measurement Gap (PMG).

Step 1802: sending, by the second node to the first node, the pre-configuration information, the pre-configuration information including one or more pieces of pre-configuration information, wherein, each item of pre-configuration information at least includes a pre-configuration ID and a corresponding pre-configuration, for example, the pre-configuration information may include information for adding, modifying or deleting the PMG; the information for adding, modifying or deleting the PMG may include one or more configurations; and each configuration may include a pre-configuration ID, for example, a preConfigGapID, for identifying a specific configuration.

According to an embodiment, if the first node is a CU and the second node is a DU, the pre-configuration information may be included in an F1AP message for transmission; the F1AP message may be a Measurement Preconfiguration Confirm message sent by the DU to the CU, or a UE Context Modification Required message; according to another embodiment, if the first node is an LMF and the second node is a base station, the pre-configuration information may be included in a NRPPa message; and the NRPPa message may be a measurement pre-configuration confirm message or other messages sent by the base station to the LMF. The above is only an example, and the first node, the second node and the message for transmitting the pre-configuration information are not limited thereto.

The first node receives and saves the pre-configuration information. If the first node is a CU, the first node sends, to the UE through an RRC reconfiguration message, the pre-configuration information received from the second node, to notify the UE of the pre-configuration information.

Step 1803: when it is required or a condition is met, sending, by the UE or the first node to the second node, information for requesting activating or deactivating pre-configuration, the information for requesting activating or deactivating pre-configuration may include one or more pre-configuration IDs (e.g., a preConfig-GapID); and activating or deactivating, by the second node, pre-configuration corresponding to the pre-configuration ID according to the information.

According to an embodiment, if the first node is a CU and the second node is a DU, the information for requesting activating or deactivating pre-configuration may be included in the F1AP message for transmission; the F1AP message may be a Measurement Activation message or a Measurement Deactivation message; according to another embodiment, if the first node is an LMF and the second node is a base station, the information for requesting activating or deactivating pre-configuration may be included in a NRPPa message for transmission; and the NRPPa message may be a Measurement Activation message or a Measurement Deactivation message. The above is only an example, and the first node, the second node and the message for transmitting the information for requesting activating or deactivating pre-configuration are not limited thereto.

If in step 1803, it is the UE that sends to the second node the information for requesting activating or deactivating pre-configuration, the second node may notify the first node or not notify the first node.

Step 1804: if the second node decides to notify the first node of an activated or deactivated pre-configuration initiated by the UE, sending, by the second node to the first node, information for notifying activated or deactivated pre-configuration, so that the first node (e.g., the first node is a CU) forwards the information to the LMF, or, so that the first node (e.g., the first node is an LMF) acquires information of the pre-configuration activated or deactivated as requested by the UE, which ultimately enables a node having more comprehensive information (e.g., the LMF) to acquire the information of the pre-configuration activated or deactivated as requested by the UE, and judge whether the pre-configuration activated or deactivated as requested by the UE is reasonable, or, whether it is the pre-configuration most suitable for the UE; if the pre-configuration is unreasonable or unsuitable, the first node may timely control or change, through signaling, the pre-configuration activated or deactivated, to ensure that the pre-configuration used by the UE is the most reasonable and suitable for the UE; if the pre-configuration is reasonable or suitable, the network does not need to send signaling or messages again to repeatedly activate or deactivate the pre-configuration. The information for notifying activated or deactivated pre-configuration may include one or more activated or deactivated pre-configurations and/or pre-configuration IDs corresponding to the one or more pre-configurations.

In this way, the information transmission method at least achieves beneficial effects below: in a separate architecture, when the pre-configuration information is generated by the DU, the method may ensure that the CU can acquire the pre-configuration information generated by the DU, and the CU tells the UE the pre-configuration information through RRC signaling; meanwhile, the method may allow the node responsible for positioning to obtain the pre-configuration information, select the most suitable configuration to activate pre-configuration according to the pre-configuration information and configuration situation of other base stations, and may also activate or deactivate pre-configuration with less signaling, which saves signaling overhead; in addition, the method may also allow the LMF to acquire the measurement gap configuration activated or deactivated as initiated by the UE, which not only avoids request conflict between the UE and the LMF, but also avoids the LMF from repeatedly sending a message for activation or deactivation, allows the LMF to better control and select the most suitable measurement gap for the UE, avoids unnecessary measurement, and saves overall time delay of positioning.

Figure 19:
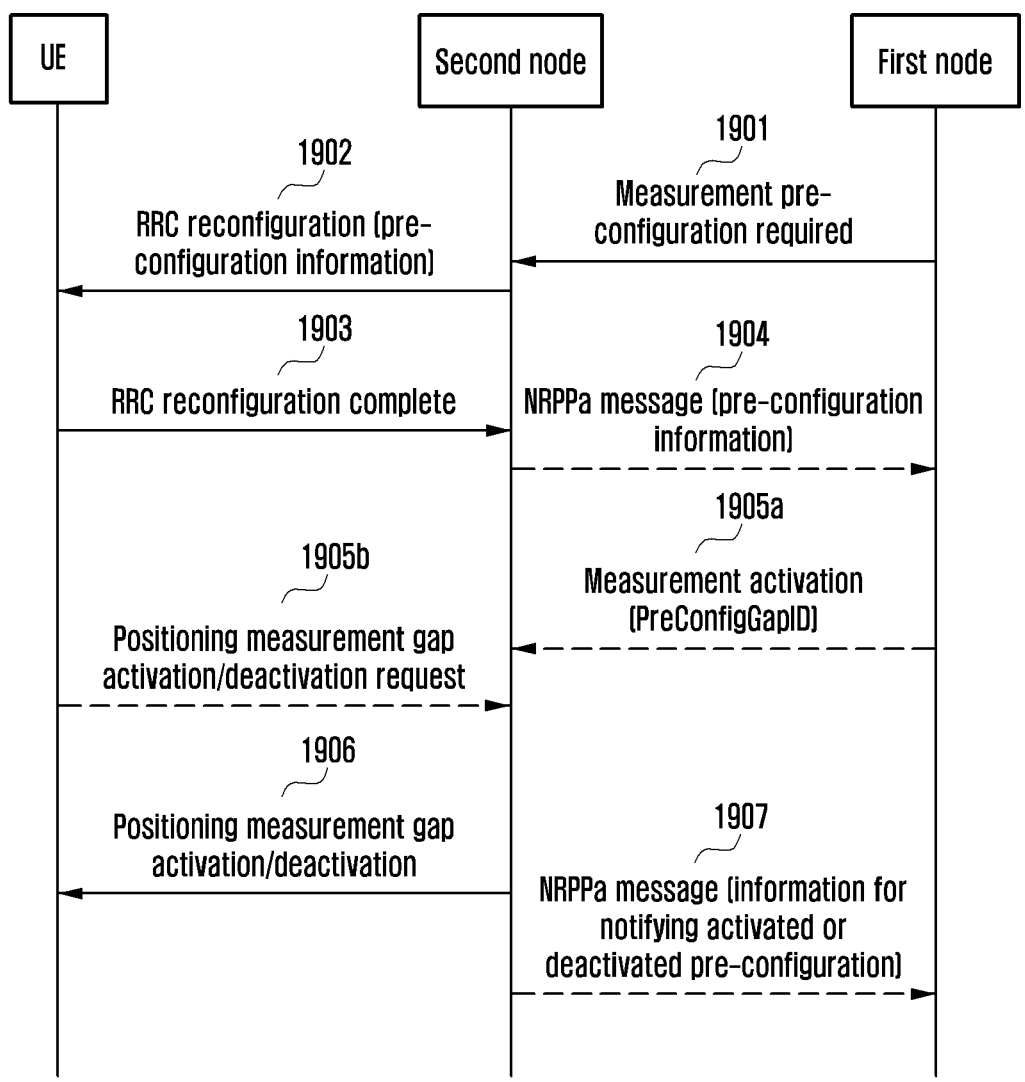
FIG. 19 shows an exemplary message flow diagram of the yet another information transmission method according to an exemplary embodiment of the present disclosure.

An exemplary message flow diagram of the yet another information transmission method provided by the present disclosure is shown in FIG. 19. Detailed description of steps unrelated to the present disclosure is omitted here. The exemplary message flow diagram may include steps of:

Step 1901: sending, by the first node to the second node, a measurement pre-configuration required message, the message including list information of pre-configuration PRS; and configuring, by the second node for the UE, the pre-configuration information according to information such as the information and/or the UE capability information. According to an embodiment, the first node is an LMF, and the second node is a base station; it should be understood that the above is only an example, and the first node and the second node are not limited thereto.

Step 1902: sending, by the second node to the UE, an RRC reconfiguration message, the RRC reconfiguration message including the pre-configuration information configured in step 1901.

Step 1903: sending, by the UE to the second node, an RRC reconfiguration complete message, for confirming to the base station that the pre-configuration information has been received by the UE.

Step 1904: the second node may send to the first node, an NRPPa message; wherein, the message may be a measurement pre-configuration confirm message or a UE context modification required message or other NRPPa messages. The message may include the pre-configuration information, and the pre-configuration information may optionally include at least one of information below:

List of measurement gap pre-configuration to add and/or modify, for indicating information of added and/or modified pre-configuration, the list including one or more measurement gap pre-configurations, and each measurement gap pre-configuration including at least one of information below:
  PreConfigGapID, for indicating the pre-configured measurement gap configuration ID;
  Measurement gap configuration, for indicating the configuration of the pre-configured measurement gap;
List of measurement gap pre-configuration to remove, for indicating information of deleted pre-configuration, the list including one or more measurement gap pre-configurations, and each measurement gap pre-configuration including at least one of information below:
  PreConfigGapID, for indicating the pre-configured measurement gap configuration ID;
  Measurement gap configuration, for indicating a configuration of the pre-configured measurement gap.

It should be understood that, in the present disclosure, the preConfigGapID may also be referred to as a pre-configured measurement gap ID; and the measurement gap configuration may also be referred to as a pre-configured measurement gap configuration.

Step 1905a: the first node may send to the second node, a measurement activation message, the message may include a preConfigGapID, for indicating activating or deactivating the measurement gap configuration corresponding to the preConfigGapID. In the present disclosure, the measurement activation message may also be a measurement deactivation message, or other NRPPa messages.

Step 1905b: the UE may send to the second node, a positioning measurement gap activation or deactivation request, the request including information of the pre-configured measurement gap activated or deactivated as requested by the UE.

Step 1906: deciding, by the second node, to send a positioning measurement gap activation or deactivation command to the UE, according to the request of the first node in step 1905a or the request of the UE in step 1905b.

Step 1907: if the activation or deactivation command sent in step 1906 is sent in response to the request from the UE in step 1905b, the second node may send to the first node, a NRPPa message, the message may include the information for notifying activated or deactivated pre-configuration, and the information for notifying activated or deactivated pre-configuration may include at least one of information below:
  Information of activated measurement gap configuration, for indicating the activated measurement gap configuration, the information may include a preConfigGapID and/or a measurement gap configuration;
  Information of the deactivated measurement gap configuration, for indicating the deactivated measurement gap configuration, the information may include a preConfigGapID and/or a measurement gap configuration.

The NRPPa message may be a measurement activation notification message or other UE-associated NRPPa messages.

The first node receives the information for notifying activated or deactivated pre-configuration, and decides whether to maintain or modify the activated or deactivated pre-configuration according to the TRP information, etc. of other base station that it knows, for example, if the first node considers that the measurement gap configuration currently activated or/deactivated as requested by the UE is suitable or reasonable, the first node does not need to execute any operation; if the first node considers that the currently activated or deactivated measurement gap configuration is unsuitable or unreasonable, for example, may result in a too long positioning time, etc., the first node may send a measurement activation message or a measurement deactivation message to the base station, and include updated information for activating or deactivating measurement gap configuration therein, to ensure that the measurement gap configuration of the UE is suitable.

In this way, the information transmission method at least achieves beneficial effects below: the method enables the LMF to obtain the pre-configuration information generated by the base station, and select the most suitable configuration to activate pre-configuration according to the pre-configuration information and/or configuration situations of other base stations, etc., and may also activate or deactivate pre-configuration with less signaling, thereby saving signaling overhead; in addition, the method may also enable the LMF to acquire the activated or deactivated measurement gap configuration initiated by the UE, which not only avoids conflicting request from the UE and the LMF, but also avoids the LMF from repeatedly sending messages for activating or deactivating the pre-configuration, to allow the LMF to better control the measurement gap of the UE, and select the most suitable measurement gap for the UE, thereby avoiding unnecessary measurement, and saving overall time delay of positioning.

Figure 20:
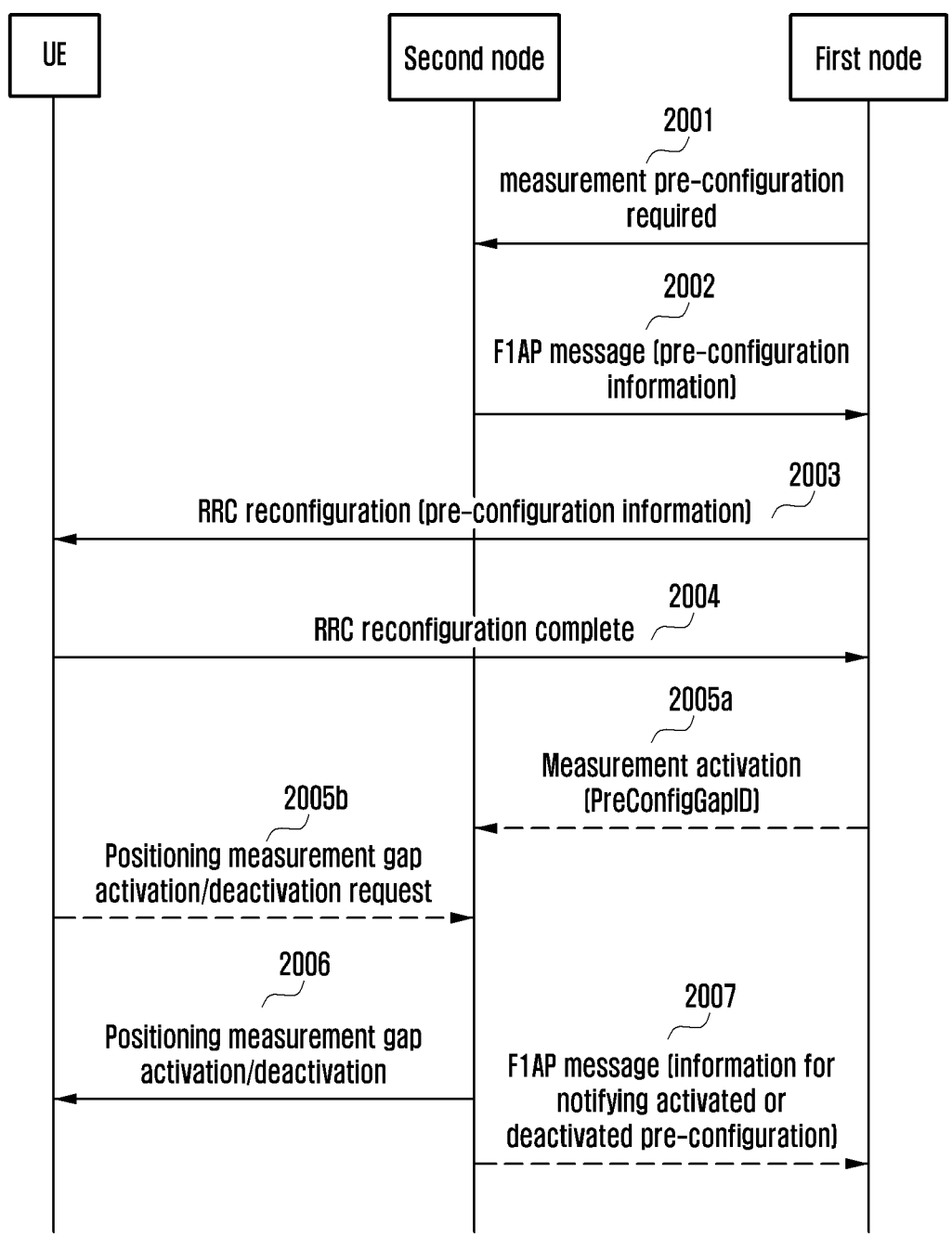
FIG. 20 shows an exemplary message flow diagram of the yet another information transmission method according to an exemplary embodiment of the present disclosure.

An exemplary message flow diagram of the yet another information transmission method provided by the present disclosure is shown in FIG. 20. Detailed description of steps unrelated to the present disclosure is omitted here. The exemplary message flow diagram may include steps of:

Step 2001: sending, by the first node to the second node, a measurement pre-configuration required message, the message including list information of the pre-configuration PRS; and configuring, by the second node, the pre-configuration information for the UE, according to information such as the information and/or the UE capability information. According to an embodiment, the first node is a gNB-CU, and the second node is a gNB-DU; it should be understood that the above is only an example, and the first node and the second node are not limited thereto.

Step 2002: sending, by the second node to the first node, an F1AP message, the message may be a measurement pre-configuration confirm message or a UE context modification required message. The message may include pre-configuration information, and the preconfiguration information may optionally include at least one of information below:

List of measurement gap pre-configuration to add and/or modify, for indicating information of added and/or modified pre-configuration, the list including one or more measurement gap pre-configurations, each measurement gap pre-configuration including at least one of information below:

PreConfigGapID, for indicating the pre-configured measurement gap configuration ID;

Measurement gap configuration, for indicating a configuration of the pre-configured measurement gap;

List of measurement gap pre-configuration to remove, for indicating information of deleted pre-configuration, the list including one or more measurement gap pre-configurations, and each measurement gap pre-configuration including at least one of information below:

PreConfigGapID, for indicating the pre-configured measurement gap configuration ID;

Measurement gap configuration, for indicating a configuration of the pre-configured measurement gap;

Step 2003: sending, by the first node to the UE, an RRC reconfiguration message, the RRC reconfiguration message includes the pre-configuration information received in step 2002. Optionally, the first node may also send an NRPPa message to the LMF, the message may include the pre-configuration information received in step 2002, as described in step 1904.

Step 2004: sending, by the UE to the first node, an RRC reconfiguration complete message, for confirming to the base station that the pre-configuration information has been received by the UE.

Step 2005a: the first node may send to the second node, a measurement activation message, the message is triggered since the first node receives measurement activation or deactivation information from the LMF, for example, step 1905a. The message may include the preConfigGapID, for indicating activating or deactivating the measurement gap configuration corresponding to the preConfigGapID. In the present disclosure, the measurement activation message may also be a measurement deactivation message, or other F1AP messages.

Step 2005b: the UE may send to the second node, a positioning measurement gap activation or deactivation request, the request includes information of the pre-configured measurement gap activated or deactivated as requested by the UE.

Step 2006: deciding, by the second node, to send a positioning measurement gap activation or deactivation command to the UE according to the request of the first node in step 2005a or the request of the UE in step 2005b.

Step 2007: if the activation or deactivation command sent in step 2006 is sent in response to the request from the UE in step 2005b, the second node may send to the first node, an F1AP message, the message may include the information for notifying activated or deactivated pre-configuration, and the information for notifying activated or deactivated pre-configuration may include at least one of information below:

Information of activated measurement gap configuration, for indicating the activated measurement gap configuration, the information may include a preConfigGapID and/or a measurement gap configuration;

Information of the deactivated measurement gap configuration, for indicating the deactivated measurement gap configuration, the information may include a preConfigGapID and/or a measurement gap configuration.

The F1AP message may be a measurement activation notification message, a UE context modification required message, or other UE-associated F1AP messages.

If the first node receives the information for notifying activated or deactivated pre-configuration from the second node, the first node may send to the LMF the information for notifying activated or deactivated pre-configuration, for example, step 1907.

The LMF receives the information for notifying activated or deactivated pre-configuration and/or other TRP information, etc., and decides whether to maintain the activated or deactivated configuration, for example, if the LMF considers that the measurement gap configuration currently activated or/deactivated as requested by the UE is suitable, the LMF may not execute any operation; if the LMF considers that the currently activated/deactivated measurement gap configuration is unsuitable, for example, may result in a too long positioning time, etc., the LMF may send a measurement activation message or a measurement deactivation message to the base station, and includes therein updated information for activating or deactivating measurement gap configuration, to ensure that the measurement gap configuration of the UE is suitable.

In this way, the information transmission method at least achieves beneficial effects below: under a separate architecture, when the pre-configuration information is generated by the DU, the method may ensure that the CU can acquire the pre-configuration information generated by the DU, and the CU tells the UE the pre-configuration information through RRC signaling; meanwhile, the method may allow the LMF to acquire the pre-configuration information, select the most suitable configuration to activate pre-configuration according to the pre-configuration information and configuration situations of other base stations, and may also activate or deactivate the pre-configuration with less signaling, which saves signaling overhead; in addition, the method may also allow the LMF to acquire the activated or deactivated measurement gap configuration initiated by the UE, which not only avoids request conflict between the UE and the LMF, but also avoids the LMF from repeatedly sending a message for activating or deactivating pre-configuration, allows the LMF to better control and select the most suitable measurement gap for the UE, avoids unnecessary measurement, and saves overall time delay of positioning.

Those skilled in the art may realize that the present disclosure can be implemented in other specific forms without changing the technical idea or basic features of the present disclosure. Therefore, it should be understood that the above-mentioned embodiments are merely examples and not limitative. The scope of the present disclosure is defined by the appended claims rather than the detailed description. Therefore, it should be understood that all modifications or changes derived from the meaning and scope of the appended claims and their equivalents fall within the scope of the present disclosure.

In the above-described embodiments of the present disclosure, all operations and messages may be selectively performed or may be omitted. In addition, the operations in each embodiment do not need to be performed sequentially, and the order of op-crations may vary. Messages do not need to be transmitted in order, and the transmission order of messages may change. Each operation and transfer of each message can be performed independently.

Although the present disclosure has been illustrated and described with reference to various embodiments of the present disclosure, those skilled in the art will understand that various changes can be made in form and detail without departing from the spirit and scope of the present disclosure as defined by the appended claims and their equivalents.

The invention claimed is:

1. A method executed by a first node in a wireless communication system, the method comprising:
generating, first configuration information of a radio bearer for transmitting a first message by a user equipment (UE) in an inactive state;
transmitting, to the UE, a radio resource control (RRC) release message including the first configuration information; and
receiving, from the UE in the inactive state, the first message comprising an LTE positioning protocol (LPP) message,
wherein the first configuration information is associated with a small data transmission (SDT).

2. The method of claim 1, further comprising:
transmitting, to the UE, a random access resource configuration.

3. The method of claim 1, further comprising:
transmitting, to a second node, a UE context setup request to establish a radio bearer supporting transmission of the first message.

4. The method of claim 3, wherein the UE context setup request includes a signaling radio bearer (SRB) identifier (ID) and information associated with a radio link control (RLC) bearer.

5. The method of claim 1, further comprising:
transmitting, to a second node, a release command message indicating to store configurations associated with the SDT.

6. The method of claim 1, further comprising:
receiving, from a second node, an initial uplink (UL) RRC message including information indicating the UE is accessing for the transmission of the first message.

7. The method of claim 6, further comprising:
receiving, from a third node, a second message for requesting a UE context including information for requesting transmission of the first message.

8. The method of claim 7, further comprising:
transmitting, to the third node, a third message including configuration of the radio bearer for transmitting the first message and information on configuration of a radio link control (RLC) bearer.

9. The method of claim 1, wherein the radio bearer for transmitting the first message comprises a signaling radio bearer 2 (SRB2).

10. A first node in a wireless communication system, the first node comprising:
a transceiver; and
a controller operably coupled with the transceiver and configured to:
generate, first configuration information of a radio bearer for transmitting a first message by a user equipment (UE) in an inactive state,
transmit, to the UE, a radio resource control (RRC) release message including the first configuration information, and
receive, from the UE in the inactive state, the first message comprising an LTE positioning protocol (LPP) message.

11. The first node of claim 10, wherein the controller is further configured to:
transmit, to the UE, a random access resource configuration.

12. The first node of claim 10, wherein the controller is further configured to:
transmit, to a second node, a UE context setup request to establish a radio bearer supporting transmission of the first message.

13. The first node of claim 12, wherein the UE context setup request includes a signaling radio bearer (SRB) identifier (ID) and information associated with a radio link control (RLC) bearer.

14. The first node of claim 10, wherein the controller is further configured to:
transmit, to a second node, a release command message indicating to store configurations associated with the SDT.

15. The first node of claim 10, wherein the controller is further configured to:
receive, from a second node, an initial uplink (UL) RRC message including information indicating the UE is accessing for the transmission of the first message.

16. The first node of claim 15, wherein the controller is further configured to:
receive, from a third node, a second message for requesting a UE context including information for requesting transmission of the first message.

17. The first node of claim 16, wherein the controller is further configured to:
transmit, to the third node, a third message including configuration of the radio bearer for transmitting the first message and information on configuration of a radio link control (RLC) bearer.

18. The first node of claim 10, wherein the radio bearer for transmitting the first message comprises a signaling radio bearer 2 (SRB2).

* * * * *